(12) United States Patent
Uchiumi et al.

(10) Patent No.: US 8,875,381 B2
(45) Date of Patent: Nov. 4, 2014

(54) METHOD OF MANUFACTURING ROTARY ELECTRIC MACHINE

(75) Inventors: Satoru Uchiumi, Tsu (JP); Hiroki Tahira, Utsunomiya (JP); Kohei Fujinoto, Utsunomiya (JP); Yasuto Ohashi, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 13/454,358

(22) Filed: Apr. 24, 2012

(65) Prior Publication Data

US 2012/0272512 A1 Nov. 1, 2012

(30) Foreign Application Priority Data

Apr. 28, 2011 (JP) ................................. 2011-101628

(51) Int. Cl.
| | | |
|---|---|---|
| *H02K 15/00* | (2006.01) | |
| *H02K 15/14* | (2006.01) | |
| *H02K 15/16* | (2006.01) | |
| *H02K 15/085* | (2006.01) | |
| *H02K 3/52* | (2006.01) | |
| *H02K 15/02* | (2006.01) | |
| *H02K 3/48* | (2006.01) | |
| *H02K 3/46* | (2006.01) | |
| *H02K 15/095* | (2006.01) | |

(52) U.S. Cl.
CPC .......... *H02K 15/0081* (2013.01); *H02K 15/085* (2013.01); *H02K 3/524* (2013.01); *H02K 15/026* (2013.01); *H02K 3/48* (2013.01); *H02K 3/46* (2013.01); *H02K 15/024* (2013.01); *H02K 15/095* (2013.01); *H02K 15/022* (2013.01)
USPC .................... 29/596; 29/598; 29/605; 29/606; 29/609; 310/179; 310/184; 310/198; 310/208; 310/215

(58) Field of Classification Search
CPC .......... H02K 1/148; H02K 3/46; H02K 3/48; H02K 3/522; H02K 3/524; H02K 15/022; H02K 15/024; H02K 15/026; H02K 15/03; H02K 15/085; H02K 15/095
USPC ................ 29/592.1, 596, 598, 605, 606, 609; 310/90, 179, 184, 198, 208, 215, 258, 310/259
See application file for complete search history.

(56) References Cited

U.S. PATENT DOCUMENTS 6,211,587 B1 * 4/2001 Enomoto et al. ................. 310/52
7,498,709 B2 * 3/2009 Shteynberg et al. .......... 310/184

(Continued)

FOREIGN PATENT DOCUMENTS

| JP | 2000-217293 | 8/2000 |
|---|---|---|
| JP | 2008-125278 | 5/2008 |
| JP | 2009-183071 | 8/2009 |

OTHER PUBLICATIONS

Chinese Office Action with partial English Translation dated Jan. 6, 2014, 7 pages.

(Continued)

*Primary Examiner* — Paul D Kim
(74) *Attorney, Agent, or Firm* — Rankin, Hill & Clark LLP

(57) ABSTRACT

A coil strand is wound on an insulator to produce a divided core member, and then the divided core member is placed on a table. While the table rotates about its axis, ends of the coil strands are inserted into lead end holding grooves, which are defined in a surface of the insulator on an outer circumferential edge of a stator and which extend along a circumferential direction of the stator.

6 Claims, 22 Drawing Sheets

(56) References Cited

U.S. PATENT DOCUMENTS

| | | | |
|---|---|---|---|
| 7,732,969 B2 * | 6/2010 | Ishizeki et al. | 310/194 |
| 8,482,180 B2 * | 7/2013 | Seki et al. | 310/215 |
| 2010/0259125 A1 * | 10/2010 | Asano et al. | 310/216.015 |
| 2011/0047780 A1 * | 3/2011 | Akita et al. | 29/527.1 |

OTHER PUBLICATIONS

Japanese Office Action with Partial English Translation dated Sep. 2, 2014, 3 pages.

* cited by examiner

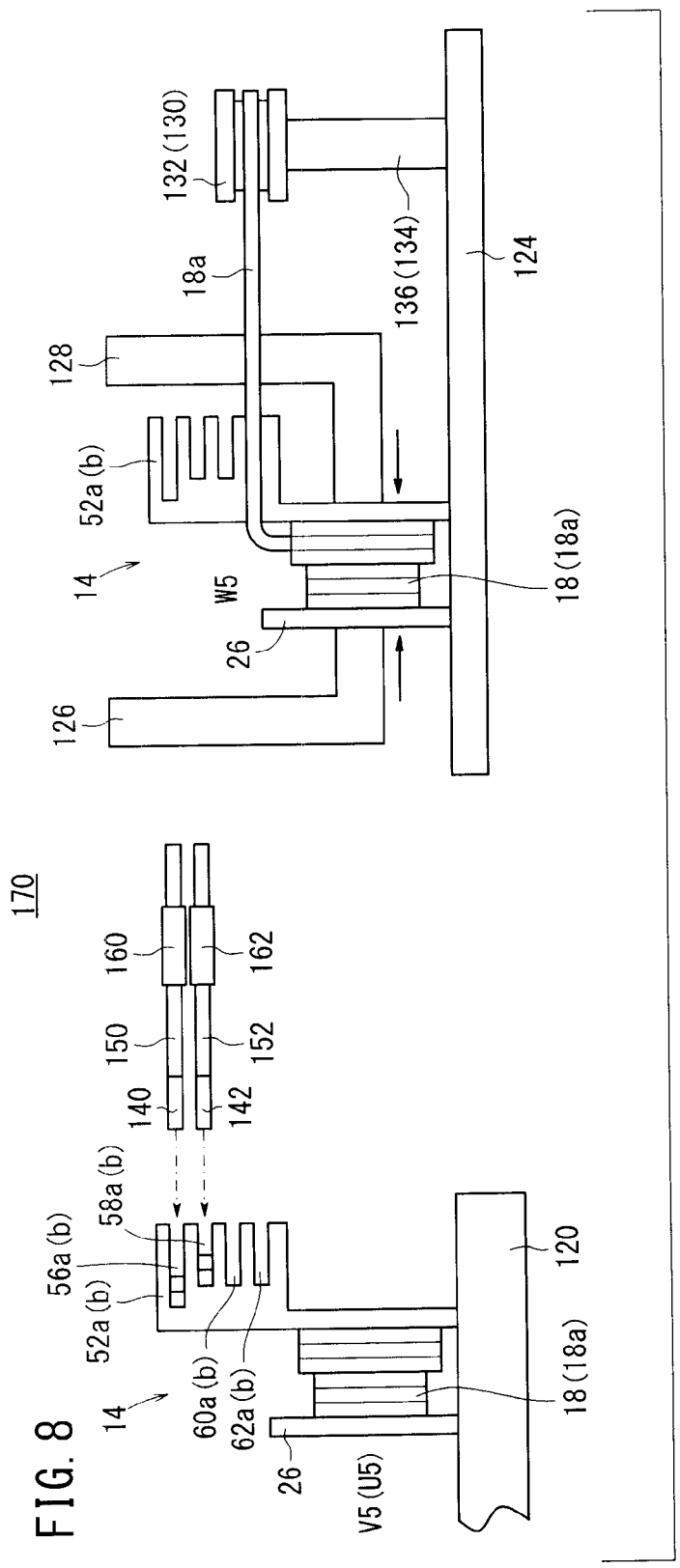

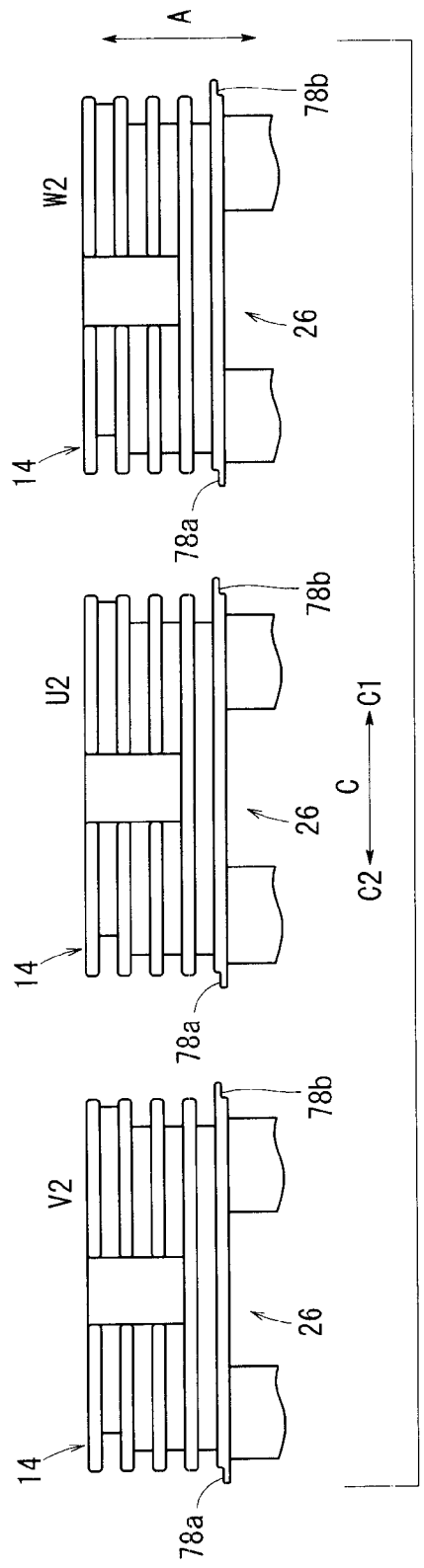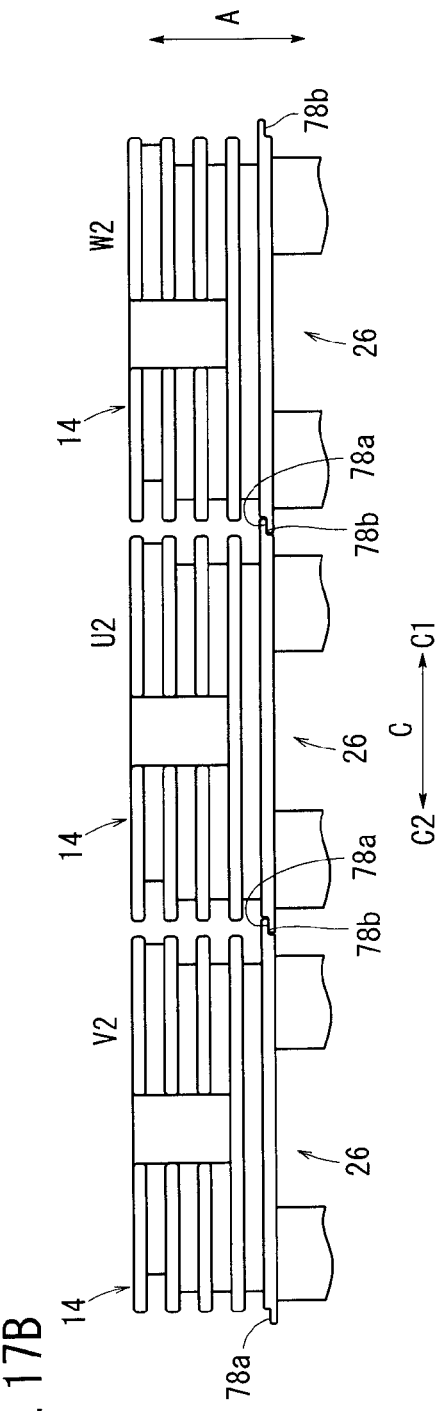

METHOD OF MANUFACTURING ROTARY ELECTRIC MACHINE

CROSS-REFERENCE TO RELATED APPLICATION

This application is based upon and claims the benefit of priority from Japanese Patent Application No. 2011-101628 filed on Apr. 28, 2011, of which the contents are incorporated herein by reference.

BACKGROUND OF THE INVENTION

1. Field of the Invention

The present invention relates to a method of manufacturing a rotary electric machine, which incorporates a stator including a stator core having an annular assembly of plural divided core members.

2. Description of the Related Art

Heretofore, stators for use in rotary electric machines include an annular array of plural divided core members, each of which comprises a divided iron core, an insulator surrounding a portion of the divided iron core, and coil leads wound on the divided iron core with the insulator interposed therebetween.

Japanese Laid-Open Patent Publication No. 2000-217293 discloses a rotary electric machine stator including an insulator which has recesses (lead end holding grooves) defined therein circumferentially along an outer circumferential surface thereof. Coil leads wound on the insulator have ends that are placed in the lead end holding grooves, and which extend to positions where the coil leads are connected to power feed lines.

SUMMARY OF THE INVENTION

With the stator disclosed in Japanese Laid-Open Patent Publication No. 2000-217293, after divided core members with coil leads wound thereon have been arranged in an annular pattern, ends of the coil leads on the divided core members are brought to positions where the ends of the coil leads are connected to power feed lines. As a result, since the ends of the coil leads on the annularly arranged divided core members extend radially outward from the stator, it is necessary to provide a wide space in advance for the ends of the coil leads.

Furthermore, since the ends of the coil leads remain exposed until they are placed in the lead end holding grooves, the ends of the coil leads tend to become damaged, and the insulation coverings of the coil leads suffer from breakage.

When the final or last divided core member is placed in position, in a process of placing the divided core members in an annular pattern, a working space available for placing the last divided core member in position is much smaller than when the other divided core members are placed in position, because two adjacent divided core members have already been installed on both sides of the slot where the final divided core member is to be inserted. Since a worker who assembles the rotary electric machine is required to place the final divided core member in position while avoiding contact with the other two adjacent divided core members, so as to avert possible damage to the two adjacent divided core members and the final divided core member, the worker needs to be highly skilled in order to manufacture the rotary electric machine disclosed in Japanese Laid-Open Patent Publication No. 2000-217293.

It is an object of the present invention to provide a method of manufacturing a rotary electric machine in a space-saving environment. Another object of the present invention is to provide a method of easily manufacturing a rotary electric machine without causing damage to divided core members.

To achieve the above objects, there is provided in accordance with the present invention a method of manufacturing a rotary electric machine, which incorporates a stator including a stator core having an annular assembly of plural divided core members, comprising the steps of (a) winding a coil strand on an insulator that surrounds a portion of a divided iron core, thereby producing a divided core member, (b) placing the divided core member on a table, and (c) while the table is rotated about its axis, inserting ends of the coil strands into lead end holding grooves, which are defined in a surface of the insulator on an outer circumferential edge of the stator, and which and extend along a circumferential direction of the stator.

The method according to the present invention does not pull the ends of the coil strands circumferentially along the stator core after all of the divided core members have been placed in an annular pattern on the table, as disclosed in Japanese Laid-Open Patent Publication No. 2000-217293. On the contrary, according to the present invention, the divided core members are placed onto the table one-by-one, and the ends of the coil strands of each of the divided core members are inserted into corresponding ones of the lead end holding grooves to thereby pull the ends of the coil strand each time that a divided core member is placed on the table. Consequently, the ends of the coil strands of all of the divided core members are prevented from extending radially outward from the stator core. Therefore, the method according to the present invention is capable of manufacturing a rotary electric machine in a space-saving environment without causing damage to the divided core members.

At least step (b) and step (c) of the method are repeated. Therefore, after all the stator cores have been fabricated in step (a), steps (b) and (c) may be repeated in order to construct the stator. It is also possible to repeat steps (a) through (c) to thereby construct the stator.

If the ends of the coil strand are temporarily wound around respective pulleys, then the ends of the coil strand are prevented from extending radially outward from the stator.

The method may further comprise the step of (d) after pulling the ends of the coil strand to a region at which terminals of the rotary electric machine are located, severing portions of the ends of the coil strand, which extend between the lead end holding grooves and the pulleys. When all of the divided core members 14 have been placed in an annular pattern on the table, the severed ends of all of the coil strands are disposed in a region where the terminals are located. Therefore, the ends of all of the coil strands can be bundled and easily connected to the terminals.

Steps (b), (c) and (d) may be performed successively from a divided core member, which is disposed near a region at which the terminals of the rotary electric machine are located, thereby placing the divided core members in an annular pattern. Consequently, the ends of the coil strands can be pulled to the region where the terminals are located without being exposed or subjected to slackening.

When a last divided core member is placed in a second region remote from the region at which the terminals of the rotary electric machine are located, two of the divided core members adjacent to the second region are spaced away from each other, and the last divided core member is placed in the second region. Thereafter, the two divided core members adjacent to the second region are brought toward the last divided core member, which has been placed in the second region, thereby joining the last divided core member and the two divided core members to each other.

Therefore, when the last divided core member is placed on the table in a minimum working space, the minimum working space may be widened in order to prevent the last divided core member from coming into contact with the two adjacent divided core members. As a result, the last divided core member can be placed on the table without causing damage to itself or to the two adjacent divided core members, thus reducing the burden on the operator of the manufacturing apparatus that carries out the method. The last divided core member can also be placed on the table without causing slackening in the ends of the coil strand.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a side elevational view of the third divided core member shown in FIG. 7;

FIG. 17A is a schematic front elevational view of the two adjacent divided core members and the last divided core member shown in FIG. 15;

FIG. 17B is a schematic front elevational view of the two adjacent divided core members and the last divided core member shown in FIG. 16;

DESCRIPTION OF THE PREFERRED EMBODIMENTS

A method of manufacturing a rotary electric machine according to an embodiment of the present invention, in relation to a stator to be incorporated in the rotary electric machine, will be described in detail below with reference to the accompanying drawings.

Figure 1:
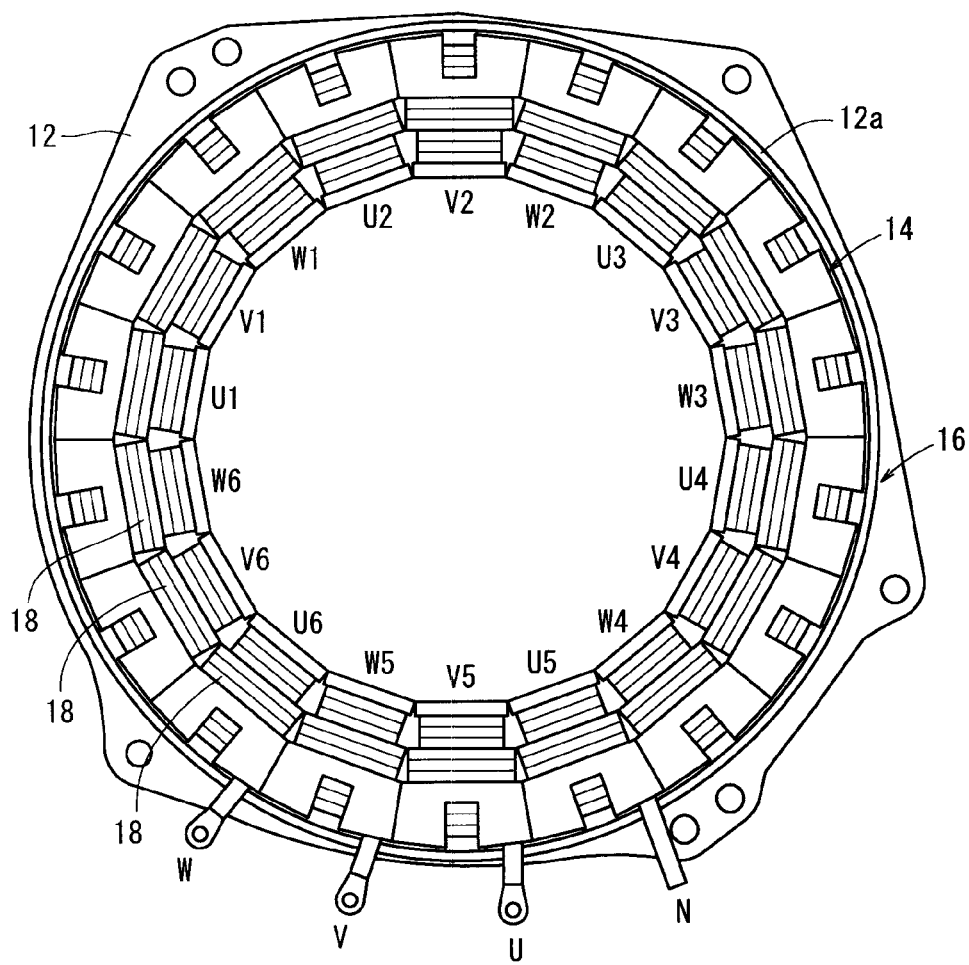
FIG. 1 is a plan view of a stator for use in a rotary electric machine, which is manufactured by a manufacturing method according to an embodiment of the present invention.

FIG. 1 shows in plan view a stator 10 for use in a rotary electric machine manufactured by a manufacturing method according to an embodiment of the present invention. The stator 10 is combined with a rotor (not shown) disposed therein, making up a rotary electric machine for use as an electric motor or generator.

The stator 10 is a three-phase Y-connected salient-pole stator. As shown in FIG. 1, the stator 10 includes a hollow holder 12, three-phase input terminals U, V, W mounted on the hollow holder 12, a neutral terminal N mounted on the hollow holder 12 to provide a neutral point, and a stator core 16 having an annular assembly of plural (18 in FIG. 1) divided core members 14, which are disposed along an inner circumferential surface 12a of the holder 12.

The stator core 16 includes three groups of six divided core members 14, each group supporting coils 18 in U-, V-, W-phases on the corresponding divided core members 14. The divided core members 14 are arranged in an annular pattern along the inner circumferential surface 12a of the holder 12, such that the coils 18 in U-, V-, W-phases (U1-through U6-phases, V1- through V6-phases, W1- through W6-phases) are arrayed clockwise successively in a sequence of U1, V1, W1, U2, . . . , U6, V6, W6. In FIG. 1, the divided core members 14, which support the coils 18 in the U5-, V5-, W5-, U6-phases, are successively arranged clockwise near a region where the three-phase input terminals U, V, W and the neutral terminal N are located.

One of the divided core members 14, which supports the respective coils 18 in the U1- through U6-phases, V1-through V6-phases, W1- through W6-phases (hereinafter also referred to as the divided core members 14 in the U1-through U6-phases, V1- through V6-phases, W1- through W6-phases), will be described below with reference to FIGS. 2 through 5. The divided core member 14 described below is structurally identical to the other divided core members 14 in all phases.

The divided core member 14 includes a divided iron core 24 made up from a plurality of substantially T-shaped stacked metal plates (steel plates) 22 blanked to shape by a press, an insulator 26 that electrically insulates the divided iron core 24, and a coil 18, which comprises a coil strand (coil lead) 18a wound on the divided iron core 24 with the insulator 26 interposed therebetween. The coil strand 18a is in the form of a flat wire having a rectangular cross-sectional shape.

The T-shaped divided iron core 24 includes a yoke 24a disposed on one end thereof in the direction of the arrow B1, i.e., in the outward direction of the stator core 16 (see FIG. 1) and extending along the direction of the arrow C, i.e., along the circumferential direction of the stator core 16, and a magnetic pole 24b that extends from the yoke 24a along the direction of the arrow B2, i.e., inwardly of the stator core 16. The yoke 24a has a substantially semicircular recess 32 defined in one end thereof in the direction of the arrow C2, and a substantially semicircular tooth 34 disposed on another end thereof in the direction of the arrow C1. The tooth 34 is fitted into the recess 32 of the adjacent yoke 24a of an adjacent divided iron core 24.

The insulator 26 is made from an electrically insulating material such as flexible plastic. The insulator 26 includes a coil frame 38 on which the coil strand 18a is wound, and a guide 40 projecting from the coil frame 38 along the direction of the arrow B1. The guide 40 serves to guide ends (a beginning end or a terminal end) of the coil strand 18a along directions of the arrow C to respective positions of the input terminals U, V, W and the neutral terminal N.

The coil frame 38 includes an upper coil frame member 38a and a lower coil frame member 38b, which are fitted together vertically along directions of the arrows A.

The upper coil frame member 38a includes an upper winder body 42a having a substantially U-shaped cross section, an upper inner circumferential wall 44a mounted on an end of the upper winder body 42a in the direction of the arrow B2, and an upper outer circumferential wall 46a mounted on an end of the upper winder body 42a in the direction of the arrow B1, in facing relation to the upper inner circumferential wall 44a.

The lower coil frame member 38b includes a lower winder body 42b having a substantially U-shaped cross section in facing relation to the upper winder body 42a, a lower inner circumferential wall 44b mounted on an end of the lower winder body 42b in the direction of the arrow B2, in facing relation to the upper inner circumferential wall 44a, and a lower outer circumferential wall 46b mounted on an end of the lower winder body 42b in the direction of the arrow B1, in facing relation to the lower inner circumferential wall 44b.

When the upper coil frame member 38a and the lower coil frame member 38b are fitted together in sandwiching relation to the magnetic pole 24b of the divided iron core 24, the upper winder body 42a and the lower winder body 42b, the upper inner circumferential wall 44a and the lower inner circumferential wall 44b, and the upper outer circumferential wall 46a and the lower outer circumferential wall 46b, respectively, are partially superposed on each other and are joined together. More specifically, the lower coil frame member 38b is inserted upwardly into the upper coil frame member 38a, so that the upper coil frame member 38a and the lower coil frame member 38b are integrally combined together in the coil frame 38, with a hole 48 being defined centrally therein, which extends along the directions of the arrows B. The magnetic pole 24b is fitted into the hole 48, and the coil strand 18a is wound between the upper inner circumferential wall 44a and the lower inner circumferential wall 44b, as well as between the upper outer circumferential wall 46a and the lower outer circumferential wall 46b, thereby providing the coil 18 on the coil frame 38.

The guide 40 projects from an upper end of the upper outer circumferential wall 46a along the direction of the arrow B1.

The guide 40 includes a plate member 50 and a lead holder 52 disposed on the plate member 50, which is substantially U-shaped as viewed in plan in FIG. 1.

The lead holder 52 serves to hold beginning ends or terminal ends of coil strands 18a that are wound on the coil frame 38, along directions of the arrow C.

Figure 4:
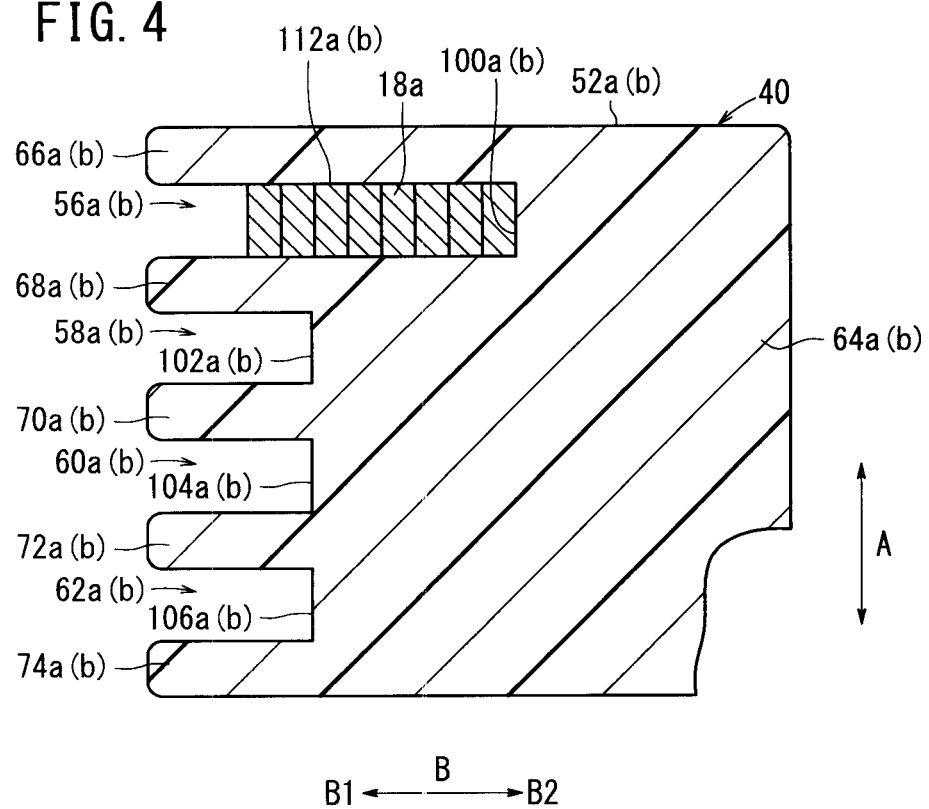
FIG. 4 is a fragmentary cross-sectional view of an insulator shown in FIG. 2.

More specifically, the lead holder 52 includes blocks 52a, 52b mounted on respective sides of the plate member 50, which are spaced from each other along respective directions of the arrows C2 and C1, and a joint 52c interconnecting respective rear ends of the blocks 52a, 52b along the direction of the arrow B2. As shown in FIG. 4, the block 52a has a plurality of lead end holding grooves 56a, 58a, 60a, 62a defined therein, which are spaced by predetermined distances along directions of the arrow A, and which extend along directions of the arrow C. Each of the lead end holding grooves 56a, 58a, 60a, 62a has a width along directions of the arrow A and a depth along directions of the arrow B, the width and the depth being large enough to hold a beginning or terminal end of a coil strand 18a in the form of a flat wire. Similarly, the block 52b has a plurality of lead end holding grooves 56b, 58b, 60b, 62b defined therein, which are spaced by predetermined distances along directions of the arrow A, and which extend along directions of the arrow C. Each of the lead end holding grooves 56b, 58b, 60b, 62b has a width and a depth large enough to hold a beginning or terminal end of a coil strand 18a. As shown in FIG. 4, the lead end holding groove 56a and the lead end holding groove 56b are of substantially the same height, the lead end holding groove 58a and the lead end holding groove 58b are of substantially the same height, the lead end holding groove 60a and the lead end holding groove 60b are of substantially the same height, and the lead end holding groove 62a and the lead end holding groove 62b are of substantially the same height, respectively.

The lead end holding grooves 56a, 58a, 60a, 62a are defined by ledges 66a, 68a, 70a, 72a, 74a of the block 52a, which extend as flat plates from a base 64a of the block 52a along the direction of the arrow B1 and along the direction of the arrow C2. Likewise, the lead end holding grooves 56b, 58b, 60b, 62b are defined by ledges 66b, 68b, 70b, 72b, 74b of the block 52b, which extend as flat plates from a base 64b of the block 52b along the direction of the arrow B1 and along the direction of the arrow C1. The ledges 72a, 72b are interconnected by a joint 76 along directions of the arrow C.

Figure 2:
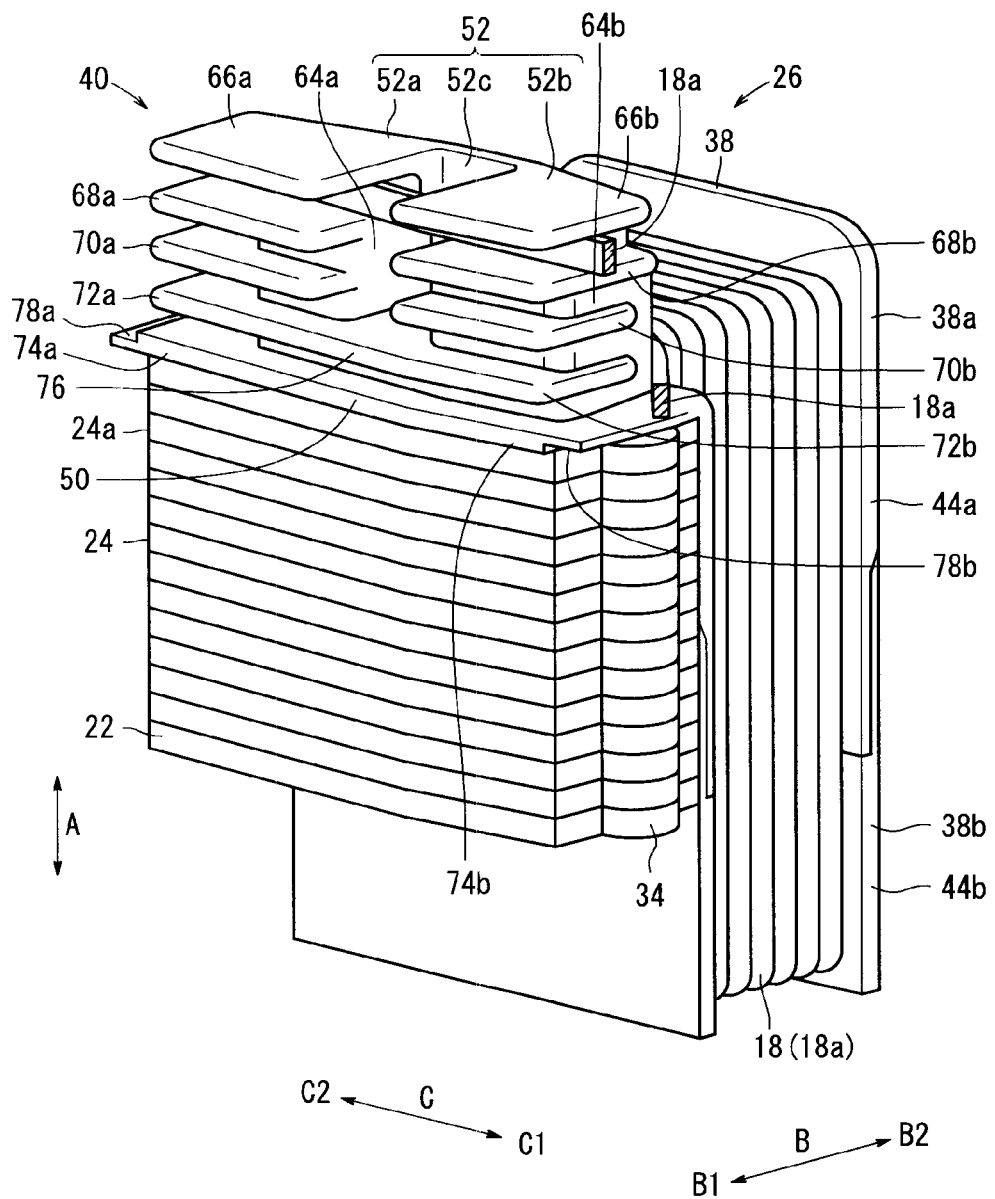
FIG. 2 is a perspective view of a divided core member of the stator shown in FIG. 1.
Figure 3:
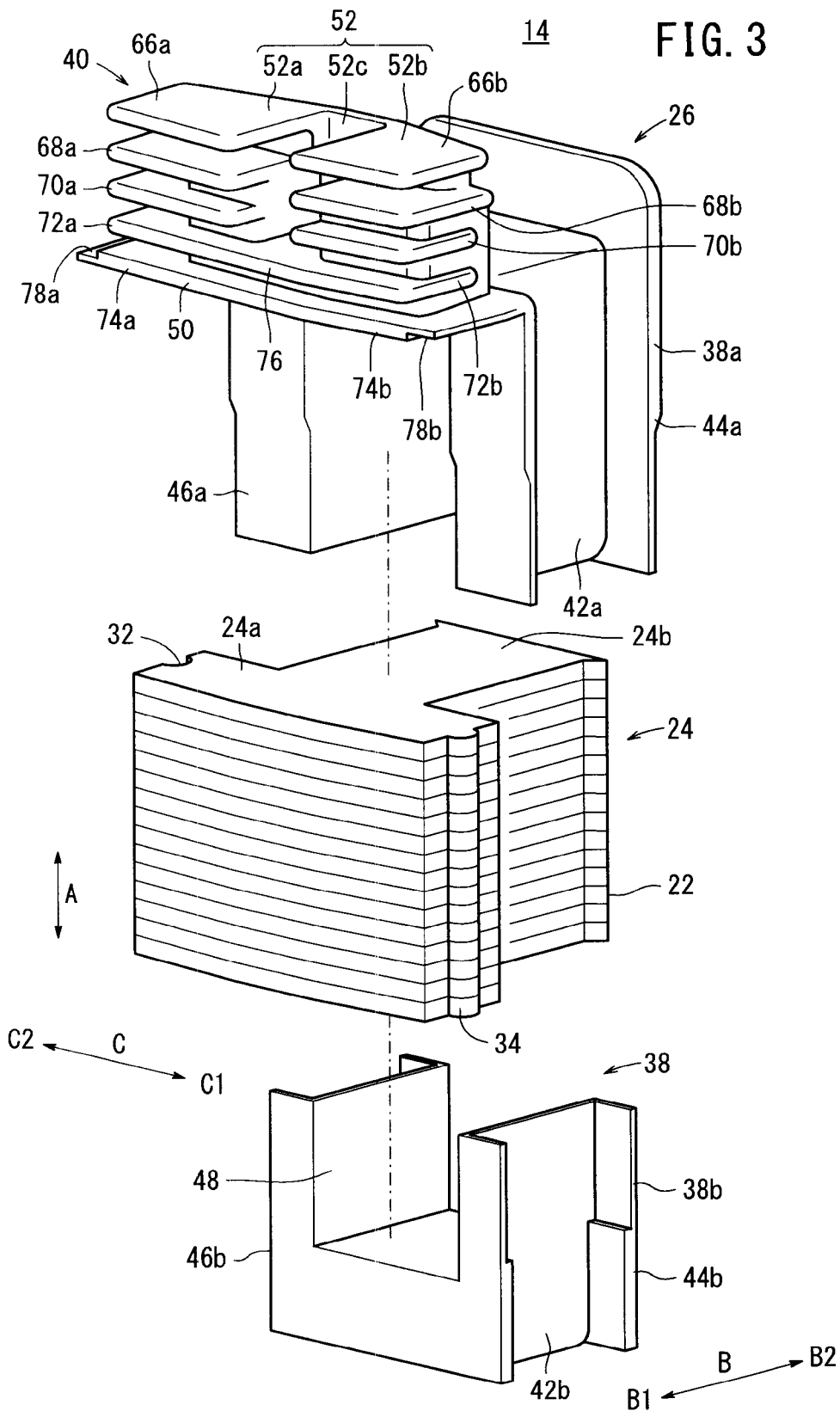
FIG. 3 is an exploded perspective view of the divided core member shown in FIG. 2.
Figure 5:
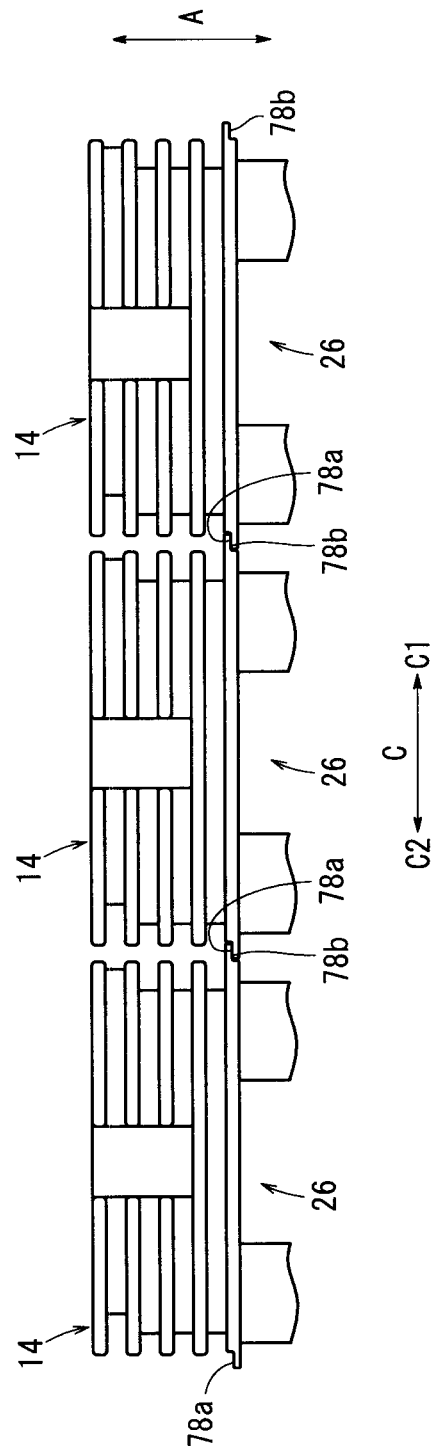
FIG. 5 is a front elevational view showing a layout of three divided core members.

As shown in FIGS. 2 and 3, the plate member 50 has a step 78a on the upper surface of one end thereof in the direction of the arrow C2, and a step 78b on the lower surface of another end thereof in the direction of the arrow C1. As shown in FIG. 5, when the three divided core members 14 are joined together along directions of the arrow C, the tooth 34 (see FIG. 3) of the left divided core member 14 fits into the recess 32 of the central divided core member 14, and the step 78b of the left divided core member 14 is placed on the step 78a of the central divided core member 14, thereby holding the left divided core member 14 and the central divided core member 14 together. At the same time, the tooth 34 of the central divided core member 14 fits into the recess 32 of the right divided core member 14, and the step 78b of the central divided core member 14 is placed on the step 78a of the right divided core member 14, thereby holding the central divided core member 14 and the right divided core member 14 together. In FIG. 5, only the insulators 26 of the divided core members 14 are illustrated.

The divided core members 14 of the stator core 16 have coil strands 18a of the same shape, which are wound into coils 18. The lead holder 52 holds beginning or terminal ends of the coil strands 18a respectively in the lead end holding grooves 56a, 58a, 60a, 62a and in the lead end holding grooves 56b, 58b, 60b, 62b along directions of the arrows C. In each of the coil strands 18a, longer sides of the flat wire are disposed and lie along bottom surfaces 100a, 102a, 104a, 106a, 100b, 102b, 104b, 106b of the lead end holding grooves 56a, 58a, 60a, 62a, 56b, 58b, 60b, 62b. Therefore, as shown in FIGS. 4 and 5, the lead end holding grooves 56a, 58a, 60a, 62a and the lead end holding grooves 56b, 58b, 60b, 62b have substantially the same width (or height in the direction of the arrow A). As shown in FIG. 5, the lead end holding grooves 56a, 56b, which are disposed at the highest position among the lead end holding grooves 56a, 58a, 60a, 62a and the lead end holding grooves 56b, 58b, 60b, 62b, are deeper than the other lead end holding grooves 58a, 60a, 62a, 58b, 60b, 62b, the latter of which are of substantially the same depth.

The lead end holding groove 56a and the lead end holding groove 56b guide and hold a beginning or terminal end of the same coil strand 18a. The lead end holding groove 58a and the lead end holding groove 58b guide and hold a beginning or terminal end of the same coil strand 18a. The lead end holding groove 60a and the lead end holding groove 60b guide and hold a beginning or terminal end of the same coil strand 18a. The lead end holding groove 62a and the lead end holding groove 62b guide and hold a beginning or terminal end of the same coil strand 18a.

More specifically, beginning ends of the coil strands 18a of the six coils 18 in the U1- through U6-phases are connected to the input terminal U, beginning ends of the coil strands 18a of the six coils 18 in the V1- through V6-phases are connected to the input terminal V, and beginning ends of the coil strands 18a of the six coils 18 in the W1-through W6-phases are connected to the input terminal W. Terminal ends of the coil strands 18a of the coils 18 in all phases, i.e., in the U1- through U6-phases, the V1- through V6-phases, and the W1- through W6-phases, are connected to the neutral terminal N.

Terminal ends of the coil strands 18a of the eighteen coils 18 in all phases are guided and held in the deepest lead end holding grooves 56a, 56b proximate the neutral terminal N.

Beginning ends of the coil strands 18a of the six coils 18 in the U1- through U6-phases are guided and held in the lead end holding grooves 58a, 58b proximate the input terminal U. Beginning ends of the coil strands 18a of the six coils 18 in the V1- through V6-phases are guided and held in the lead end holding grooves 60a, 60b proximate the input terminal V.

Beginning ends of the coil strands 18a of the six coils 18 in the W1- through W6-phases are guided and held in the lead end holding grooves 62a, 62b proximate the input terminal W.

In FIG. 4, the terminal ends of the coil strands 18a are illustrated as being placed in the lead end holding grooves 56a, 56b.

The stator 10 for use in a rotary electric machine according to the present embodiment is basically constructed as described above. A method of manufacturing a rotary electric machine according to the present embodiment will be described below with reference to FIGS. 6 through 21A, as well as with reference to FIGS. 1 through 5.

First, a manufacturing method according to the present embodiment will generally be described below with reference to the flowchart shown in FIG. 6. Thereafter, a process of installing ends of the coil strand 18a on the divided core member 14 in the W5-phase, which is positioned near the input terminals U, V, W and the neutral terminal N, and a process of installing ends of the coil strand 18a on the divided core member 14 in the last U2-phase, will be described with reference to FIGS. 7 through 21A.

Figure 6:
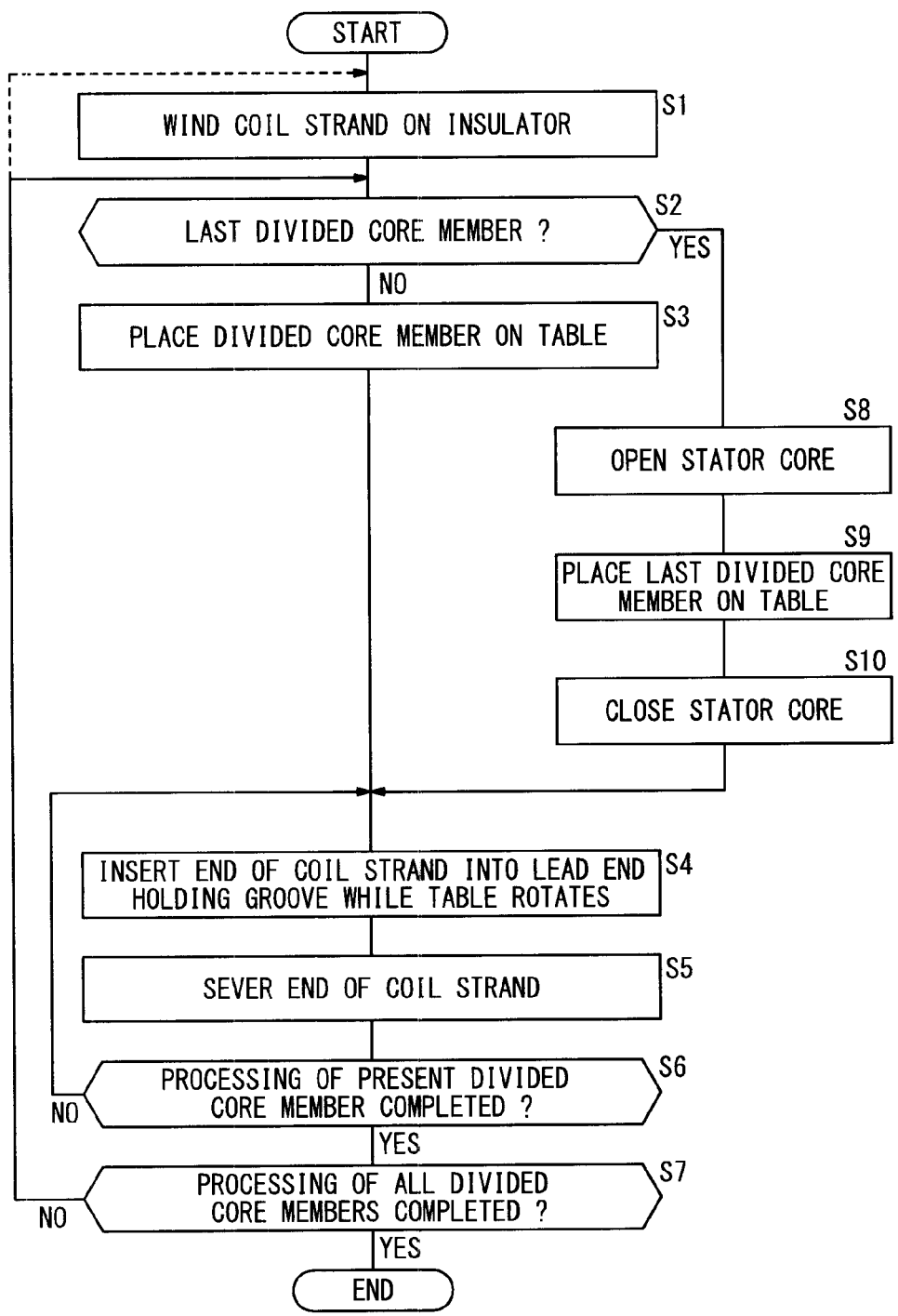
FIG. 6 is a flowchart of the manufacturing method according to the embodiment of the present invention.

In step S1 (step (a), first step) shown in FIG. 6, coil strands 18a are wound on the insulators 26, which are fitted over all the divided iron cores 24 (see FIGS. 2 and 3) in order to assemble the stator 10 (see FIG. 1), thereby producing coils 18. On each divided core member 14, the beginning end of the coil strand 18a extends along the direction of the arrow B1 from the end of the block 52b in the direction of the arrow C1, whereas the terminal end of the coil strand 18a extends along the direction of the arrow B1 from the end of the block 52a in the direction of the arrow C2.

In step S1, all of the divided core members 14 are fabricated. Then, the divided core members 14 are placed on a rotatable table 120 in an annular pattern (see FIG. 8) in order to produce the stator core 16. If a divided core member 14, which is to be placed next on the table 120, is not the last divided core member 14 (step S2: NO), then in step S3 (step (b), second step), the divided core member 14 is fixed at a given position on the table 120.

According to the present embodiment, when the divided core members 14 are placed in an annular pattern on the table 120, the divided core members 14 are placed successively one-by-one from those near the input terminals U, V, W and the neutral terminal N. More specifically, in order to manufacture the stator 10 shown in FIG. 1, the divided core members 14 are placed on the table 120 in a sequence of U5-, V5-, W5- . . . phases along one-half of the full circumferential edge of the stator core 16, and then the divided core members 14 are placed on the table 120 in a sequence of W4-, V4-, U4- . . . phases along the other one-half of the full circumferential edge of the stator core 16. Thereafter, the divided core member 14 in the U2-phase, i.e., the last divided core member 14, is placed on the table 120.

In step S4 (step (c), third step), while the table 120 rotates, the terminal end of the coil strand 18a is inserted into the lead end holding grooves 56a, 56b of the divided core member 14, which was placed on the table 120 in step S3, and the beginning end of the coil strand 18a is inserted into the lead end holding grooves having the same height among the lead end holding grooves 58a, 60a, 62a, 58b, 60b, 62b. The beginning and terminal ends of the coil strand 18a are then pulled to the region where the input terminals U, V, W and the neutral terminal N are located.

When a divided core member 14 is placed on the table 120 at a location spaced from the input terminals U, V, W and the neutral terminal N, other divided core members 14 have already been placed on the table 120 along directions toward the input terminals U, V, W and the neutral terminal N. For example, when the divided core member 14 in the W6-phase is placed on the table 120, the divided core members 14 in the V6-, U6-, W5-, V5-, and U5-phases have already been placed on the table 120 along directions toward the input terminals U, V, W and the neutral terminal N. Accordingly, the beginning and terminal ends of the coil strand 18a can be pulled to the region where the input terminals U, V, W and the neutral terminal N are located, without becoming exposed or being subjected to slackening.

In step S5 (step (d), fourth step), with the beginning and terminal ends of the coil strand 18a inserted in certain ones of the lead end holding grooves 58a, 60a, 62a, 58b, 60b, 62b, when one of the beginning and terminal ends of the coil strand 18a is pulled to one of the input terminals U, V, W and the neutral terminal N, rotation of the table 120 is stopped. Then, the coil strand 18a is severed by a cutter 122 such as scissors (see FIGS. 10A, 11B, 19B, and 20B), thereby leaving a certain coil strand length extending radially outward from the stator 10 from corresponding ones of the lead end holding grooves 58a, 60a, 62a, 58b, 60b, 62b.

If the other end of the coil strand 18a has not been pulled (step S6: NO), then the other end of the coil strand 18a is pulled in the same manner as in steps S4 and S5. The other end of the coil strand 18a is pulled to one of the input terminals U, V, W and the neutral terminal N.

At this time, beginning and terminal ends of the coil strand 18a have been pulled to one of the input terminals U, V, W and the neutral terminal N (step S6: YES). If the beginning and terminal ends of the coil strands 18a of all of the divided core members 14 have not yet been pulled (step S7: NO), then control returns to step S2. Then, steps S2 through S7 are repeated on the next divided core member 14.

If a divided core member 14, which is to be placed on the table 120 next, is the last divided core member 14, i.e., the divided core member 14 in the U2-phase, (step S2: YES), then in step S8, the divided core member 14 in the W1-phase and the divided core member 14 in the V2-phase, which are disposed on the table 120 adjacent to the region where the divided core member 14 in the U2-phase is to be placed, are spaced apart from each other in the circumferential direction of the stator core 16.

When the divided core member 14 in the W1-phase and the divided core member 14 in the V2-phase have been spaced apart from each other, the region on the table 120 in which the divided core member 14 in the U2-phase is to be placed is widened. Then, in step S9, the divided core member 14 in the U2-phase is inserted into the widened region. Thereafter, the divided core member 14 in the W1-phase and the divided core member 14 in the V2-phase are brought toward the divided core member 14 in the U2-phase, which has been inserted in the circumferential direction of the stator core 16, thereby successively joining the divided core member 14 in the W1-phase, the divided core member 14 in the U2-phase, and the divided core member 14 in the V2-phase (step S10).

Thereafter, steps S4 and S5 are performed on the divided core member 14 in the U2-phase. When ends of the coil strand 18a of the divided core member 14 in the U2-phase are pulled (step S6: YES, step S7: YES), all of the divided core members 14 are placed in an annular pattern, and ends of all of the coil strands 18a are pulled to the region where the input terminals U, V, W and the neutral terminal N are located, thereby completing fabrication of the stator core 16.

Then, the stator core 16 is placed in the holder 12, and the input terminals U, V, W and the neutral terminal N are connected to respective ends of the coil strands 18a. Fabrication of the stator 10 is now completed. Finally, the stator 10 is installed in a rotary electric machine, so as to complete fabrication of the rotary electric machine.

The manufacturing method according to the present embodiment is capable of manufacturing a rotary electric machine in a space-saving environment by repeating steps S2 through S7 on each of the divided core members 14, without causing damage to the divided core members 14.

The present invention is not limited to the above embodiment, but changes or modifications may be made thereto. For example, steps S1 through S7 may be repeated on each of the divided core members 14 of the stator core 16.

Details of the manufacturing method according to the present embodiment, for placing the divided core member 14 in the W5-phase on the table 120, and pulling ends of the coil strand 18a of the divided core member 14 in the W5-phase, will be described below with reference to FIGS. 7 through 12B.

Figure 7:
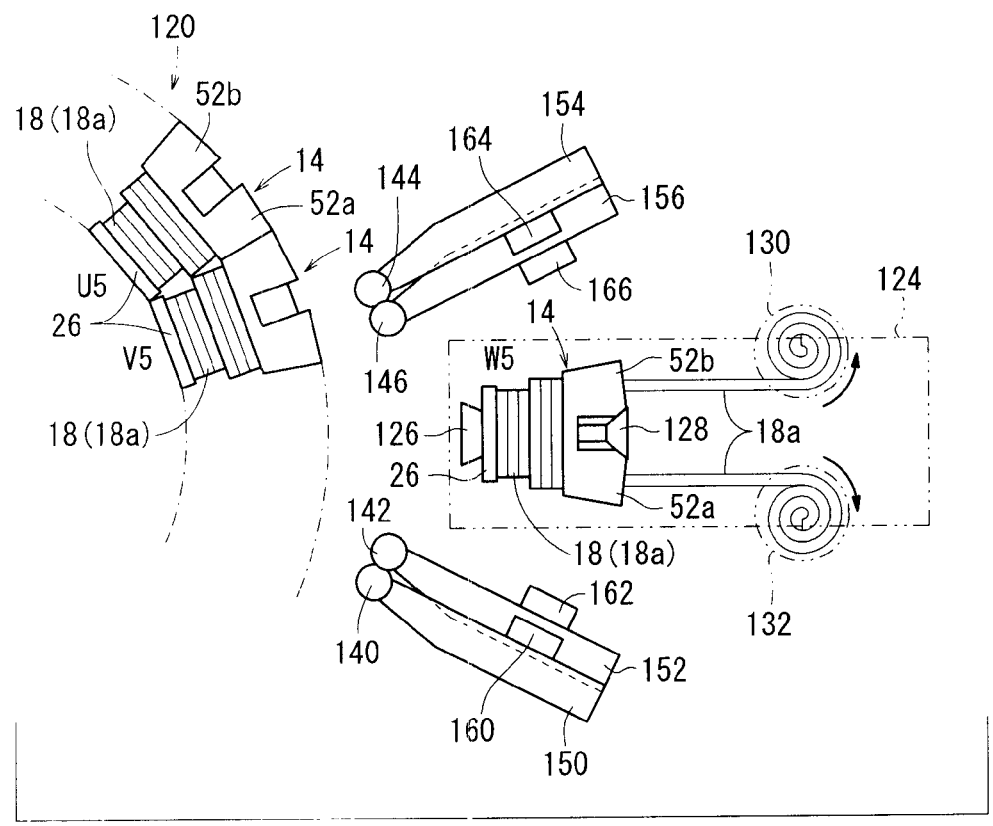
FIG. 7 is a plan view schematically showing a third divided core member immediately before the divided core member is placed on a table.

FIGS. 7 and 8 show the divided core member 14 in the W5-phase immediately before the divided core member 14 is placed on the table 120.

Before the divided core member 14 in the W5-phase is placed on the table 120, the divided core member 14 in the U5-phase and the divided core member 14 in the V5-phase already have been placed on the table 120 to form part of an annular pattern.

The divided core member 14 in the W5-phase is carried on a pallet 124 in the form of a long rectangular plate and is clamped to the pallet 124 by a pair of clamps 126, 128. A longitudinal axis of the pallet 124 is oriented toward the table 120. The divided core member 14 in the W5-phase, which is carried thereon, has the blocks 52a, 52b that project away from the table 120. The clamp 126 holds the upper inner circumferential wall 44a and the lower inner circumferential wall 44b (see FIGS. 2 and 3) of the insulator 26, whereas the clamp 128 holds the upper outer circumferential wall 46a and the lower outer circumferential wall 46b of the insulator 26. Therefore, the divided core member 14 in the W5-phase is clamped to the pallet 124 and is prevented from being displaced along the longitudinal direction of the pallet 124, i.e., in directions toward and away from the table 120.

The pallet 124 supports a pulley 130 for temporarily winding the beginning end of the coil strand 18a, which has been wound on the insulator 26 of the divided core member 14 in the W5-phase, and a pulley 132 for temporarily winding the terminal end of the coil strand 18a, which has been wound on the insulator 26 of the divided core member 14 in the W5-phase. The pulleys 130, 132, which comprise H-section pulleys, are rotatably mounted respectively on support rods 134, 136, which extend upwardly from the pallet 124.

A plurality of presser jigs 140, 142, 144, 146 in the form of disks are disposed in the vicinity of the table 120. The presser jigs 140, 142, 144, 146 are supported on respective support arms 150, 152, 154, 156 and are capable of being moved toward and away from the lead end holding grooves 56a, 58a, 60a, 62a, 56b, 58b, 60b, 62b of the divided core members 14 that have been placed on the table 120. The presser jigs 140, 142, 144, 146 have a thickness, which is slightly smaller than the width of the lead end holding grooves 56a, 58a, 60a, 62a, 56b, 58b, 60b, 62b. The presser jigs 140, 142, 144, 146 are capable of entering into the lead end holding grooves 56a, 58a, 60a, 62a, 56b, 58b, 60b, 62b and pressing ends of coil strands 18a, which have been inserted into the lead end holding grooves 56a, 58a, 60a, 62a, 56b, 58b, 60b, 62b.

More specifically, the presser jig 140 and the support arm 150 are disposed at a predetermined height, which allows the presser jig 140 to enter into the lead end holding grooves 56a, 56b of the divided core members 14 that have been placed on the table 120. The presser jig 142 and the support arm 152 are disposed at a predetermined height, which allows the presser jig 142 to enter into the lead end holding grooves 58a, 58b of the divided core members 14 that have been placed on the table 120.

Similarly, the presser jig 144 and the support arm 154 are disposed at a predetermined height, which allows the presser jig 144 to enter into the lead end holding grooves 60a, 60b of the divided core members 14 that have been placed on the table 120. The presser jig 146 and the support arm 156 are disposed at a predetermined height, which allows the presser jig 146 to enter into the lead end holding grooves 62a, 62b of the divided core members 14 that have been placed on the table 120.

A plurality of holders 160, 162, 164, 166 are disposed respectively alongside the support arms 150, 152, 154, 156, for holding the ends of the coil strands 18a that have been temporarily wound on the pulleys 130, 132, and to prevent the ends of the coil strands 18a from becoming displaced off the pulleys 130, 132, or from collapsing or becoming loosened on the pulleys 130, 132.

The table 120, the pallet 124, the clamps 126, 128, the pulleys 130, 132, the presser jigs 140, 142, 144, 146, the support arms 150, 152, 154, 156, and the holders 160, 162, 164, 166 jointly form a manufacturing apparatus 170 for manufacturing the stator core 16 by placing the divided core members 14 in an annular pattern on the table 120.

As shown in FIG. 8, the presser jigs 140, 142, the support arms 150, 152, and the holders 160, 162 are moved toward and away from the lead end holding grooves 56a, 56b, 58a, 58b.

The manufacturing apparatus 170 is used to place the divided core member 14 in the W5-phase on the table 120, and to pull ends of the coil strand 18a of the divided core member 14, in the following manner.

Figure 9A:
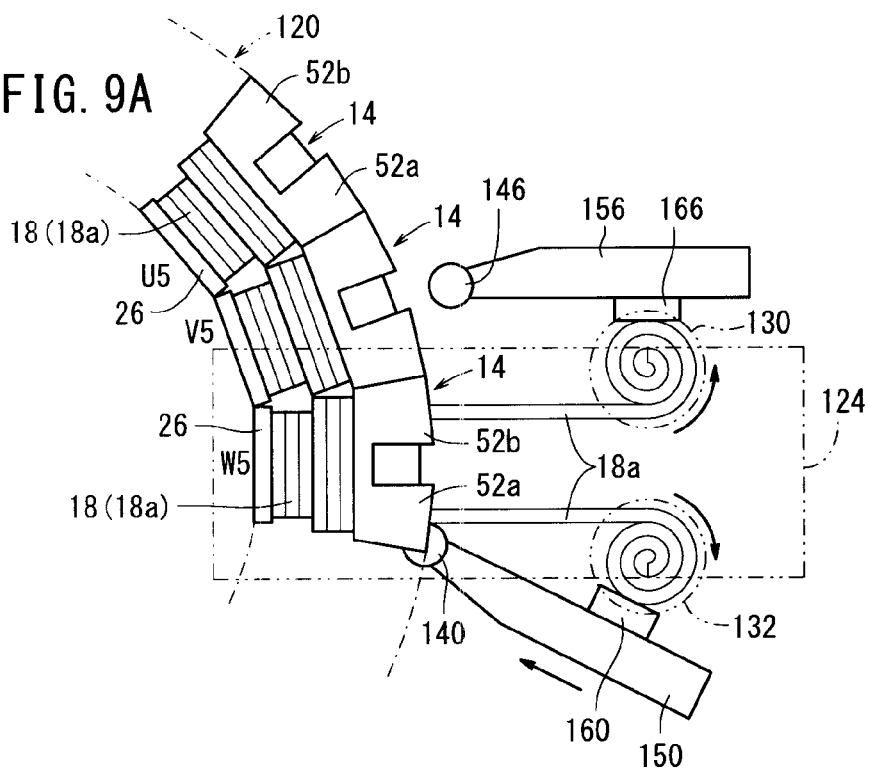
FIG. 9A is a plan view schematically showing the third divided core member, which has been placed on the table.

First, the pallet 124 is moved by a moving mechanism (not shown) from the position shown in FIGS. 7 and 8 to the position shown in FIG. 9A, and then, the divided core member 14 in the W5-phase is placed on the table 120 (step S3 shown in FIG. 6). Thereafter, the clamps 126, 128 release the divided core member 14 and are retracted from the divided core member 14. In FIGS. 9A through 12B, for illustrative purposes, ends of the coil strands 18a of the divided core members 14 in the U5- and V5-phases are omitted from illustration.

At this time, the beginning end of the coil strand 18a of the divided core member 14 in the W5-phase is temporarily wound on the pulley 130, while the terminal end of the coil strand 18a is temporarily wound on the pulley 132. The beginning end of the coil strand 18a is pulled to the position of the input terminal W, i.e., the position of the divided core member 14 in the U6-phase, which is angularly spaced clockwise from the position of the divided core member 14 in the W5-phase as shown in FIGS. 1 and 9A. Further, the terminal end of the coil strand 18a is pulled to the position of the neutral terminal N, i.e., a position near the block 52b of the divided core member 14 in the U5-phase as shown in FIGS. 1 and 9A.

In other words, the beginning end of the coil strand 18a and the terminal end of the same coil strand 18a are pulled in crossing relation to each other, as viewed in plan in FIGS. 9A through 12B. To achieve such crossing of the coil strands, the beginning and terminal ends of the coil strand 18a are pulled in the following manner.

First, the support arm 150 is moved toward the divided core member 14 in the W5-phase, so as to insert the presser jig 140 into the lead end holding groove 56a (see FIGS. 4 and 8) of the divided core member 14 in the W5-phase until the presser jig 140 contacts the terminal end of the coil strand 18a, which is temporarily wound on the pulley 132. The support arm 152 also is moved toward the divided core member 14 in the W5-phase, so as to bring the holder 166 into contact with the beginning end of the coil strand 18a, which is temporarily wound on the pulley 130. At this time, the pulleys 130, 132 are rotated in directions to wind the beginning and terminal ends of the coil strand 18a to such an extent that the beginning and terminal ends of the coil strand 18a are prevented from becoming loosened.

Figure 9B:
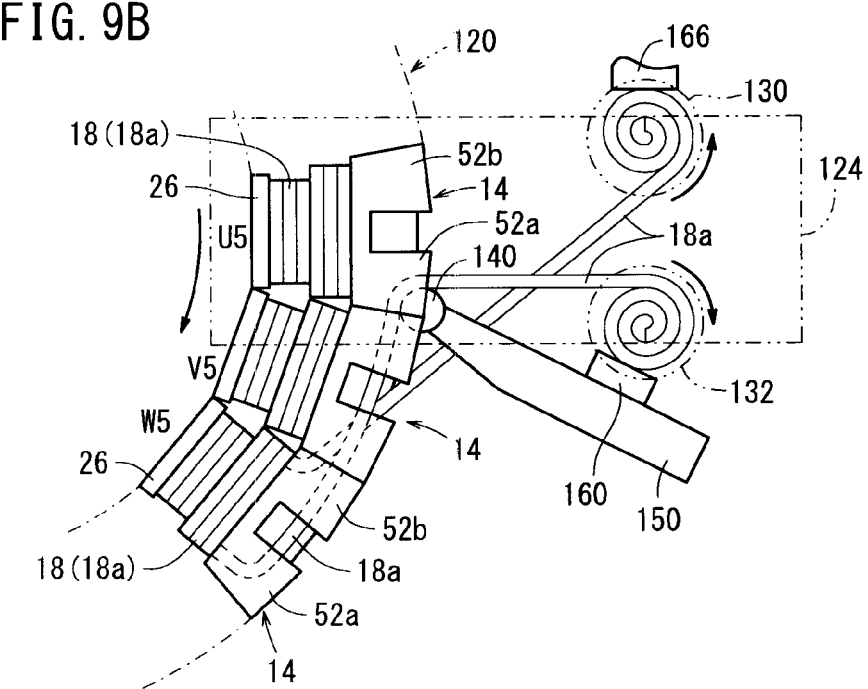
FIG. 9B is a plan view schematically showing the manner in which an end of a coil strand is inserted into a lead end holding groove while the table rotates in one direction.

Then, a rotational shaft (not shown), which is coupled to the center of the table 120, is rotated in order to rotate the table 120 about its axis in the clockwise direction shown in FIG. 9B, and along a circumferential direction from the U5-phase to the W5-phase. Thus, the divided core members 14 on the table 120 are rotated clockwise. The beginning and terminal ends of the coil strand 18a of the divided core member 14 in the W5-phase are unreeled respectively from the pulleys 130, 132 in opposition to the rotation of the pulleys 130, 132, so as to wind the beginning and terminal ends of the coil strand 18a.

Since, as described above, the presser jig 140 has been inserted into the lead end holding groove 56a of the divided core member 14 in the W5-phase, the presser jig 140 presses or inserts the terminal end of the coil strand 18a into the lead end holding grooves 56a, 56b of the divided core members 14 as the coil strand 18a is paid out from the pulley 132. The presser jig 140 pulls the terminal end of the coil strand 18a in a clockwise direction circumferentially along the stator core 16 while the table 120 and the divided core members 14 mounted thereon are rotated clockwise (step S4).

Inasmuch as the presser jig 140 is in the form of a disk, the presser jig 140 can press the terminal end of the coil strand 18a reliably into the lead end holding grooves 56a, 56b and down to the bottom surfaces 100a, 100b without applying undue surface pressure to the terminal end of the coil strand 18a. In addition, when the disk-shaped presser jig 140 presses and pulls the terminal end of the coil strand 18a, the presser jig 140 can avoid causing damage to the terminal end of the coil strand 18a upon contact therewith.

Figure 10A:
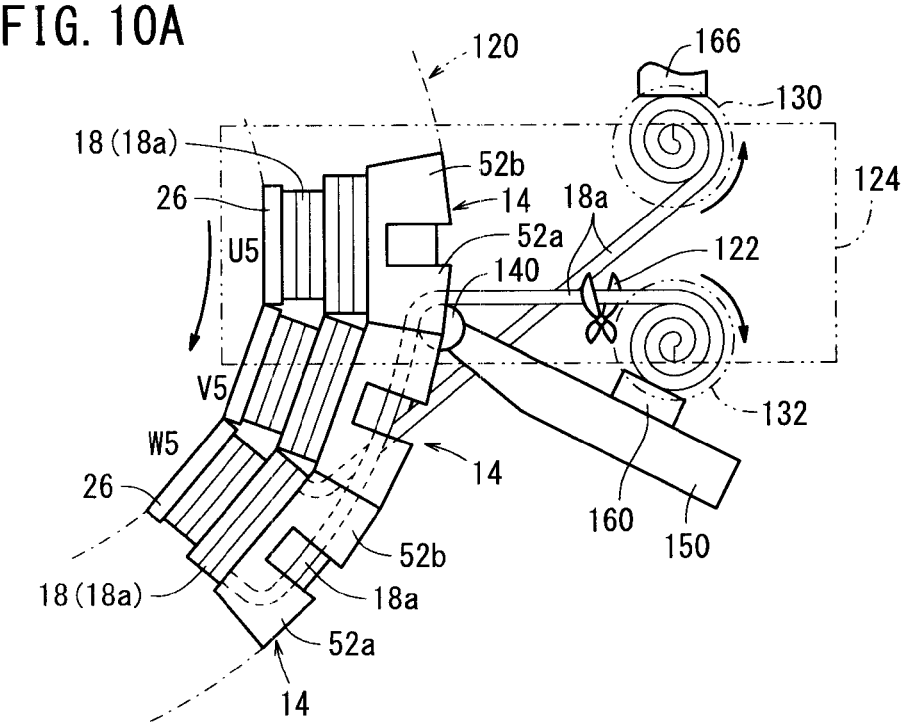
FIG. 10A is a plan view schematically showing the manner in which the end of the coil strand is severed.

When the terminal end of the coil strand 18a of the divided core member 14 in the W5-phase reaches the position of the neutral terminal N, i.e., a position proximate the divided core member 14 in the U5-phase, as shown in FIG. 10A, the cutter 122 is used to sever the terminal end of the coil strand 18a, thereby leaving a certain coil strand length, i.e., a coil strand length large enough to enable connection to the neutral terminal N (step S5), which extends from the lead end holding groove 56a of the divided core member 14 in the W5-phase.

At this time, the portion of the terminal end of the coil strand 18a, which is inserted into the lead end holding groove 56a, is pressed in the lead end holding groove 56a by the presser jig 140, so that the portion of the terminal end of the coil strand 18a, which is temporarily wound on the pulley 132, is held by the holder 160. Therefore, when the terminal end of the coil strand 18a is severed by the cutter 122, the portion of the terminal end of the coil strand 18a, which is inserted into the lead end holding grooves 56a, 56b, is prevented from becoming dislodged from the lead end holding grooves 56a, 56b. Further, the portion of the terminal end of the coil strand 18a, which is temporarily wound on the pulley 132, is prevented from becoming dislodged from the pulley 132, or from collapsing or becoming loosened on the pulley 132.

The beginning end of the coil strand 18a is unwound from the pulley 130 in a straight line toward the divided core member 14 in the W5-phase, and is held by the holder 166.

Therefore, the beginning end of the coil strand 18a also is prevented from becoming dislodged, or from collapsing or becoming loosened on the pulley 130.

Figure 10B:
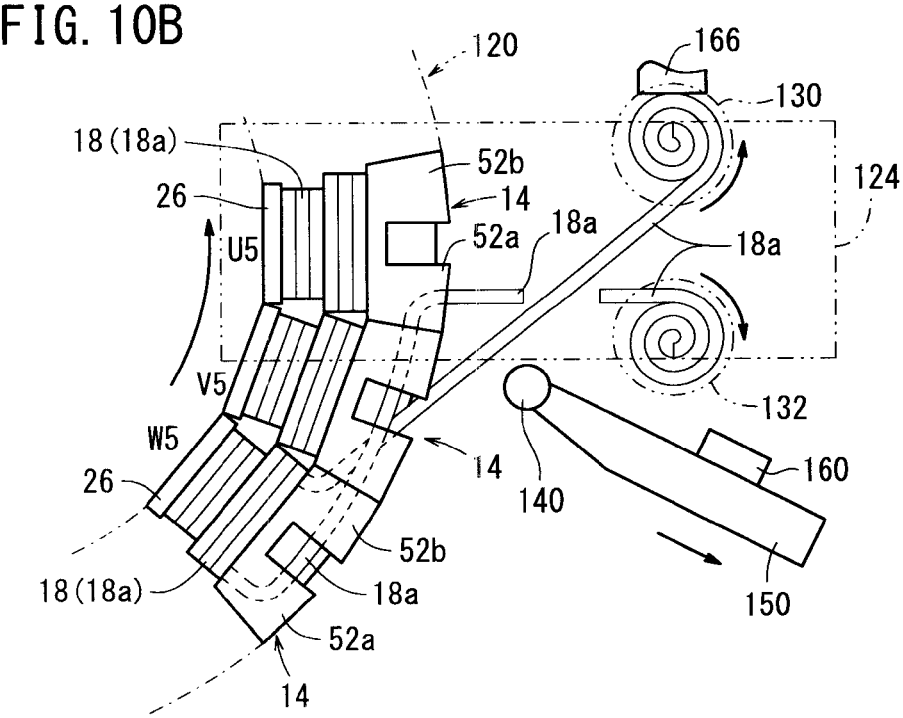
FIG. 10B is a plan view schematically showing the manner in which the table is rotated in another direction opposite to the one direction shown in FIG. 9B.

When the terminal end of the coil strand 18a of the divided core member 14 in the W5-phase has been pulled to the region where the neutral terminal N is located, the presser jig 140, the support arm 150, and the holder 160 are retracted from the table 120, as shown in FIG. 10B. Thus, the presser jig 140 and the holder 160 are spaced from the terminal end of the coil strand 18a.

At this time, the beginning end of the coil strand 18a of the divided core member 14 in the W5-phase has not yet been pulled to the region where the input terminal W is located, i.e., a position near the divided core member 14 in the U5-phase (step S6: NO). The rotational shaft (not shown), which is coupled to the center of the table 120, is now rotated counterclockwise as shown in FIG. 10B, so as to rotate the table 120. Since the beginning end of the coil strand 18a, which is unreeled from the pulley 130, tends to be subjected to slackening due to counterclockwise rotation of the table 120, at this time, the pulley 130 winds the beginning end of the coil strand 18a in synchronism with counterclockwise rotation of the table 120.

Figure 11A:
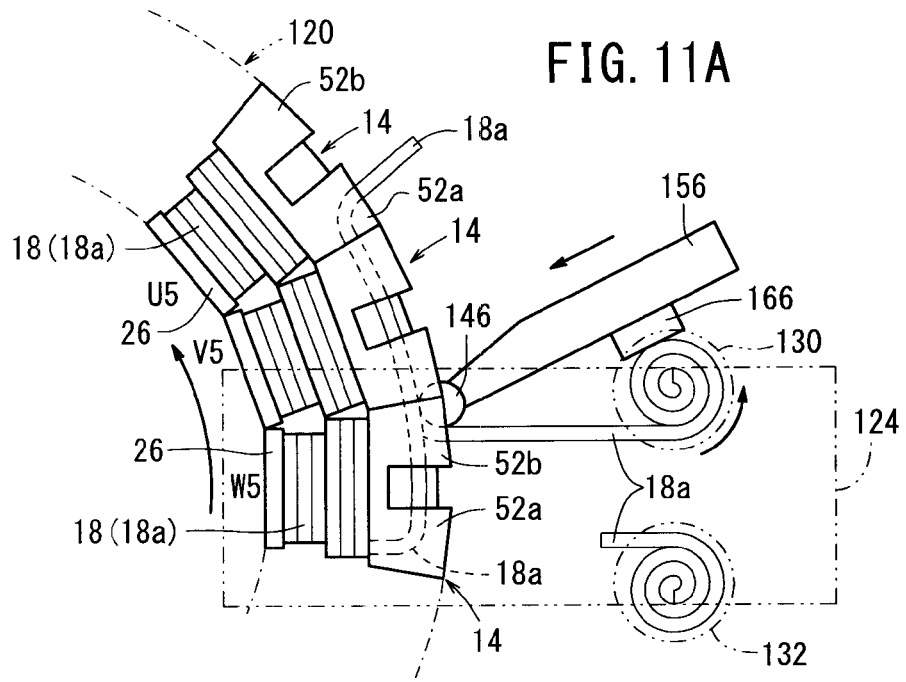
FIG. 11A is a plan view schematically showing the manner in which another end of the coil strand is inserted into a lead end holding groove while the table rotates in the other direction shown in FIG. 10B.

Once the divided core member 14 in the W5-phase has been returned to the position of the pallet 124, as shown in FIG. 11A, rotation of the table 120 is temporarily stopped, and the presser jig 146, the support arm 156, and the holder 166 are moved toward the divided core member 14 in the W5-phase. The presser jig 146 is inserted into the lead end holding groove 62b of the divided core member 14 in the W5-phase, and comes into contact with the beginning end of the coil strand 18a. The portion of the beginning end of the coil strand 18a, which is temporarily wound on the pulley 130, is continuously held by the holder 166.

Then, the table 120 resumes clockwise rotation in order to further unreel the beginning end of the coil strand 18a from the pulley 130. The presser jig 146 presses or inserts the beginning end of the coil strand 18a into the lead end holding grooves 62a, 62b of the divided core members 14 as the coil strand 18a is paid out from the pulley 130. The presser jig 146 also pulls the beginning end of the coil strand 18a counterclockwise circumferentially along the stator core 16 as the table 120 and the divided core members 14 are rotated counterclockwise (step S4).

Inasmuch as the presser jig 146 is in the form of a disk similar to the presser jig 140, the presser jig 146 can reliably press the beginning end of the coil strand 18a into the lead end holding grooves 62a, 62b and down to the bottom surfaces 106a, 106b without applying undue surface pressure to the beginning end of the coil strand 18a. In addition, when the disk-shaped presser jig 146 presses and pulls the beginning end of the coil strand 18a, the disk-shaped presser jig 146 can avoid causing damage to the beginning end of the coil strand 18a upon contact therewith.

Figure 11B:
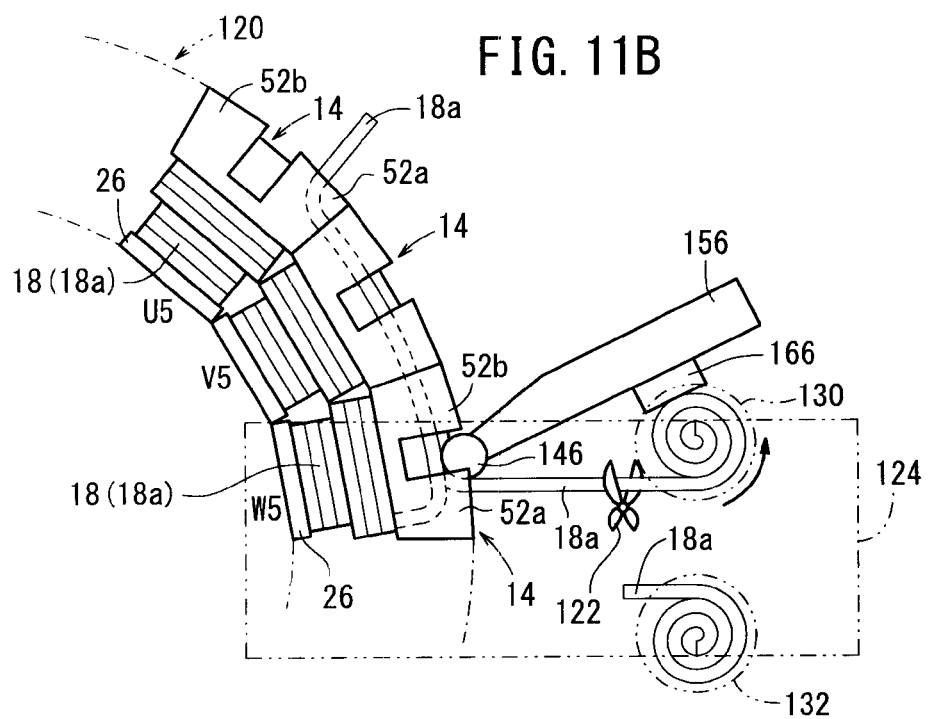
FIG. 11B is a plan view schematically showing the manner in which the other end of the coil strand is severed.

When the beginning end of the coil strand 18a of the divided core member 14 in the W5-phase reaches the position of the input terminal W, as shown in FIG. 11B, the cutter 122 is used to sever the beginning end of the coil strand 18a, thereby leaving a certain coil strand length, i.e., a coil strand length large enough to be connected to the input terminal W, which extends from the lead end holding groove 62a of the divided core member 14 in the W5-phase (step S5). At this time, the portion of the beginning end of the coil strand 18a, which is inserted into the lead end holding groove 62a, is pressed by the presser jig 146, whereas the portion of the beginning end of the coil strand 18a, which is temporarily wound on the pulley 130, is held by the holder 166. Therefore, when the beginning end of the coil strand 18a is severed by the cutter 122, the portion of the beginning end of the coil strand 18a that is inserted into the lead end holding grooves 62a, 62b is prevented from becoming dislodged from the lead end holding grooves 62a, 62b. Further, the portion of the beginning end of the coil strand 18a that is temporarily wound on the pulley 130 is prevented from becoming dislodged from the pulley 130, or from collapsing or becoming loosened on the pulley 130.

Figure 12A:
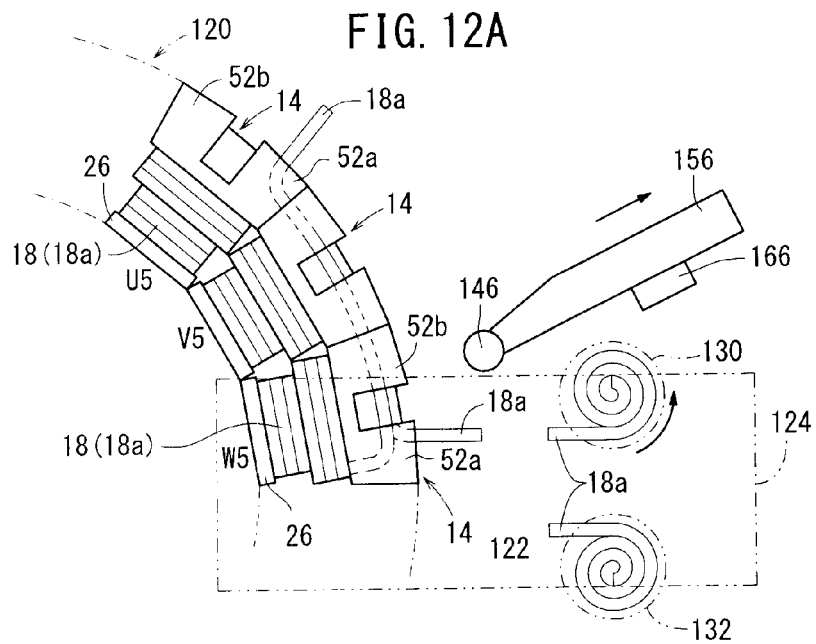
FIG. 12A is a plan view schematically showing the manner in which a presser jig is retracted from the other end of the coil strand.
Figure 12B:
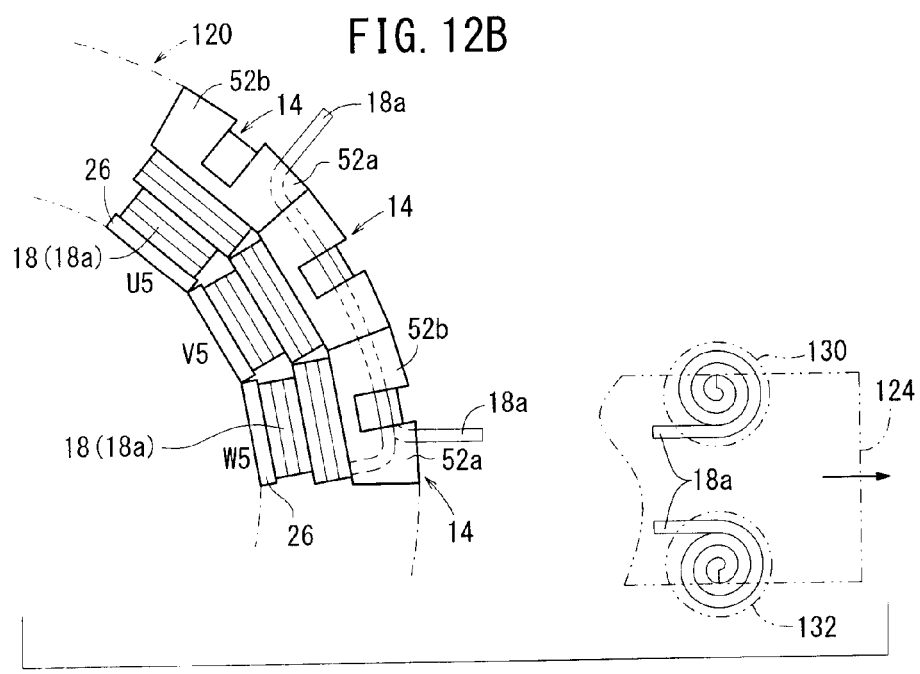
FIG. 12B is a plan view schematically showing the manner in which a pallet with pulleys mounted thereon is retracted from the divided core members.

When the beginning end of the coil strand 18a of the divided core member 14 in the W5-phase has been pulled to the region where the input terminal W is located, as shown in FIG. 12A, the presser jig 146, the support arm 156, and the holder 166 are retracted from the table 120. Consequently, the presser jig 146 and the holder 166 are spaced from the beginning end of the coil strand 18a.

Finally, the pallet 124 is retracted from the table 120. The process of installing beginning and terminal ends of the coil strand 18a on the divided core member 14 in the W5-phase is now completed (step S6: YES).

Details of the manufacturing method according to the present embodiment, for placing the last divided core member 14 in the U2-phase on the table 120 and for pulling ends of the coil strand 18a of the divided core member 14 in the last U2-phase, will be described below with reference to FIGS. 13 through 21B.

The manufacturing apparatus 170 is used to place the divided core member 14 in the U2-phase on the table 120, as well as to pull ends of the coil strand 18a of the divided core member 14 in the U2-phase.

Figure 13:
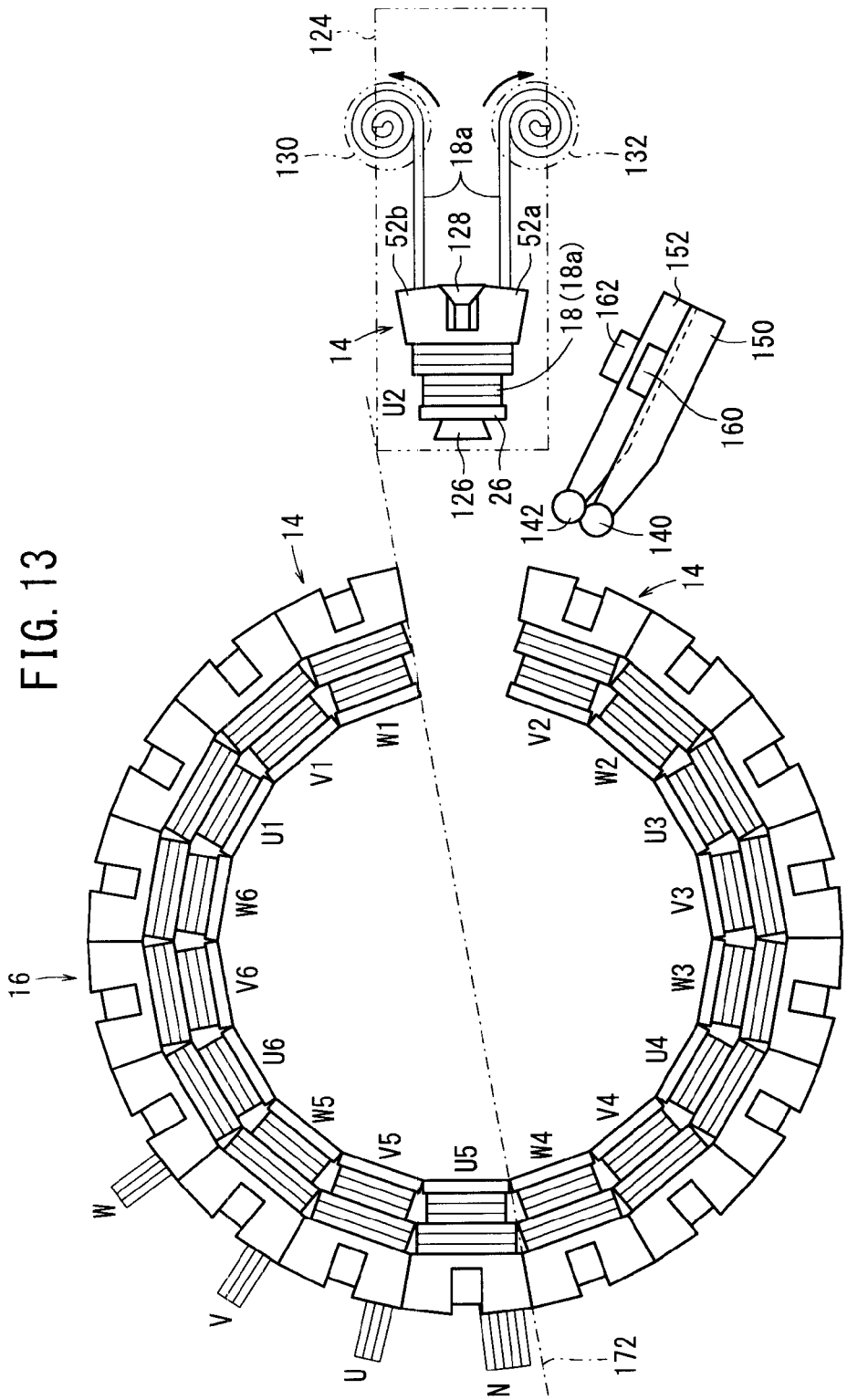
FIG. 13 is a plan view schematically showing a last divided core member immediately before the last divided core member is placed on the table.

As shown in FIG. 13, when the divided core members 14 apart from the divided core member 14 in the U2-phase have been placed in an annular pattern on the table 120 (see FIG. 8), the region where the divided core member 14 in the U2-phase is intended to be placed on the table 120 provides a space, which is just wide enough to enable the divided core member 14 in the U2-phase to be accommodated therein. Therefore, the working space available for positioning the divided core member 14 in the U2-phase is much smaller than when the other divided core members 14 are placed in position. If the pallet 124 simply is moved toward the table 120 in order to place the divided core member 14 in the U2-phase on the table 120 while the other divided core members 14 already are positioned thereon, then as shown in FIG. 13, the divided core member 14 in the U2-phase is likely to come into contact with the adjacent divided core members 14, i.e., the divided core member 14 in the W1-phase and the divided core member 14 in the V2-phase, potentially resulting in damage to the divided core member 14 in the U2-phase and to the divided core members 14 adjacent thereto.

According to the present embodiment, when the seventeen divided core members 14 apart from the divided core member 14 in the U2-phase have been placed in an annular pattern on the table 120, as shown in FIG. 13, the seventeen divided core members 14 are separated into a first group of eight divided core members 14, which range from the divided core members 14 in the W4-phase to the divided core members 14 in the V2-phase, i.e., the divided core members 14 along roughly one-half of the full circumferential edge of the stator core 16 on one side of a central line 172, and a second group of nine divided core members 14, which range from the divided core members 14 in the U5-phase to the divided core members 14 in the W1-phase, i.e., the divided core members 14 along roughly the other one-half of the full circumferential edge of the stator core 16 on the other side of the central line 172.

Figure 14:
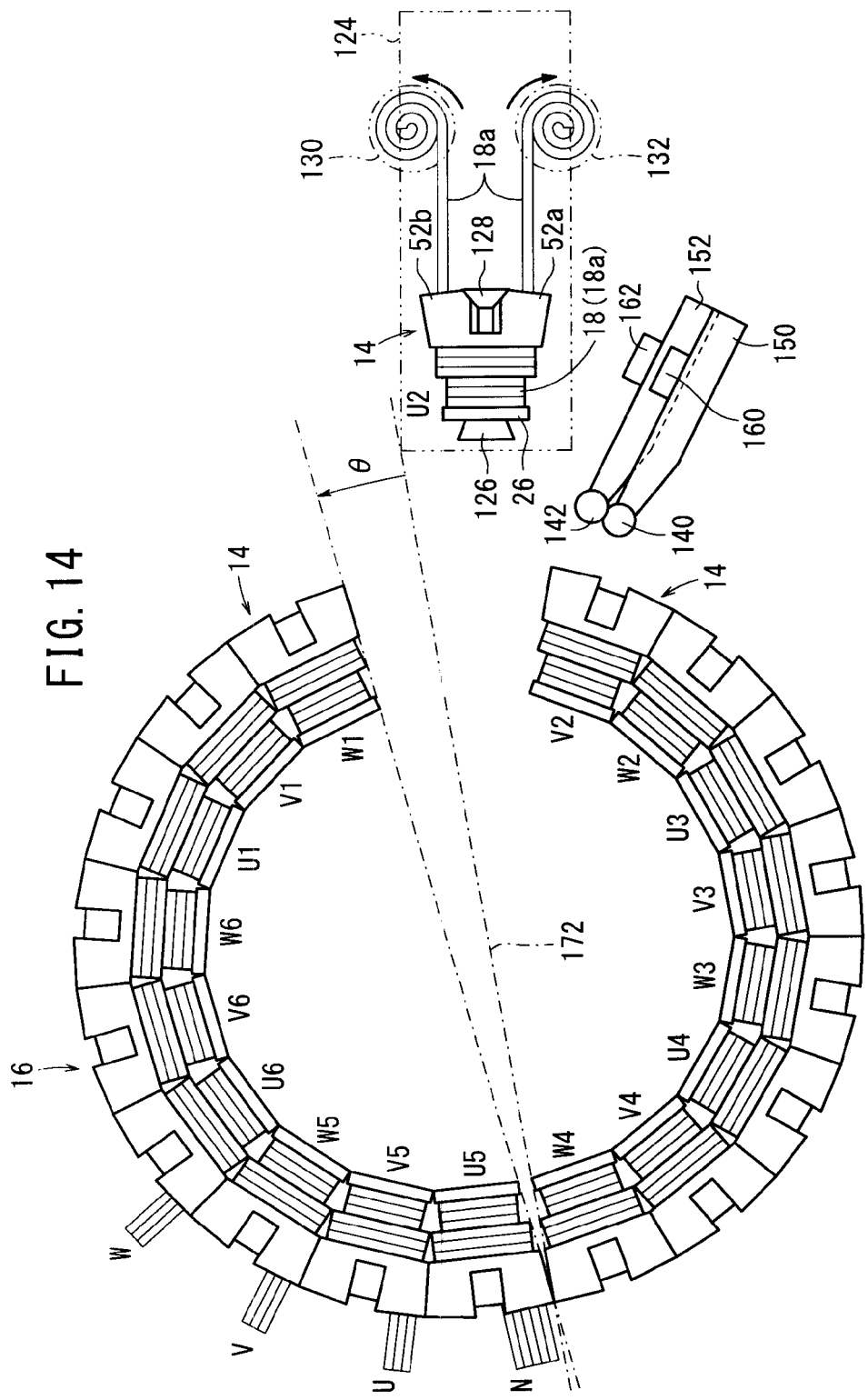
FIG. 14 is a plan view schematically showing the manner in which two divided core members adjacent to a slot where the last divided core member is to be inserted are spaced apart from each other in a circumferential direction of the table.

Then, as shown in FIG. 14, the second group of nine divided core members 14 is angularly displaced away from the first group of eight divided core members 14 by an angle θ from the central line 172, thereby spacing the divided core members 14 in the W1-phase and the divided core members 14 in the V2-phase from each other along the circumferential direction of the stator core (step S8 in FIG. 6). At this time, a sufficient working space is created between the divided core members 14 in the W1-phase and the divided core members 14 in the V2-phase in order to enable the divided core member 14 in the U2-phase to be placed on the table 120.

The second group of nine divided core members 14 may be angularly displaced away from the first group of eight divided core members 14 by an angle θ from the central line 172 in the following manner. Namely, the table 120 comprises two independently angularly movable table members. The first group of eight divided core members 14 is placed on one of the table members, whereas the second group of nine divided core members 14 is placed on the other table member. The other table member is moved angularly away from the one table member by the angle θ, thereby providing a sufficient working space for placing the divided core member 14 in the U2-phase on the table 120.

Figure 15:
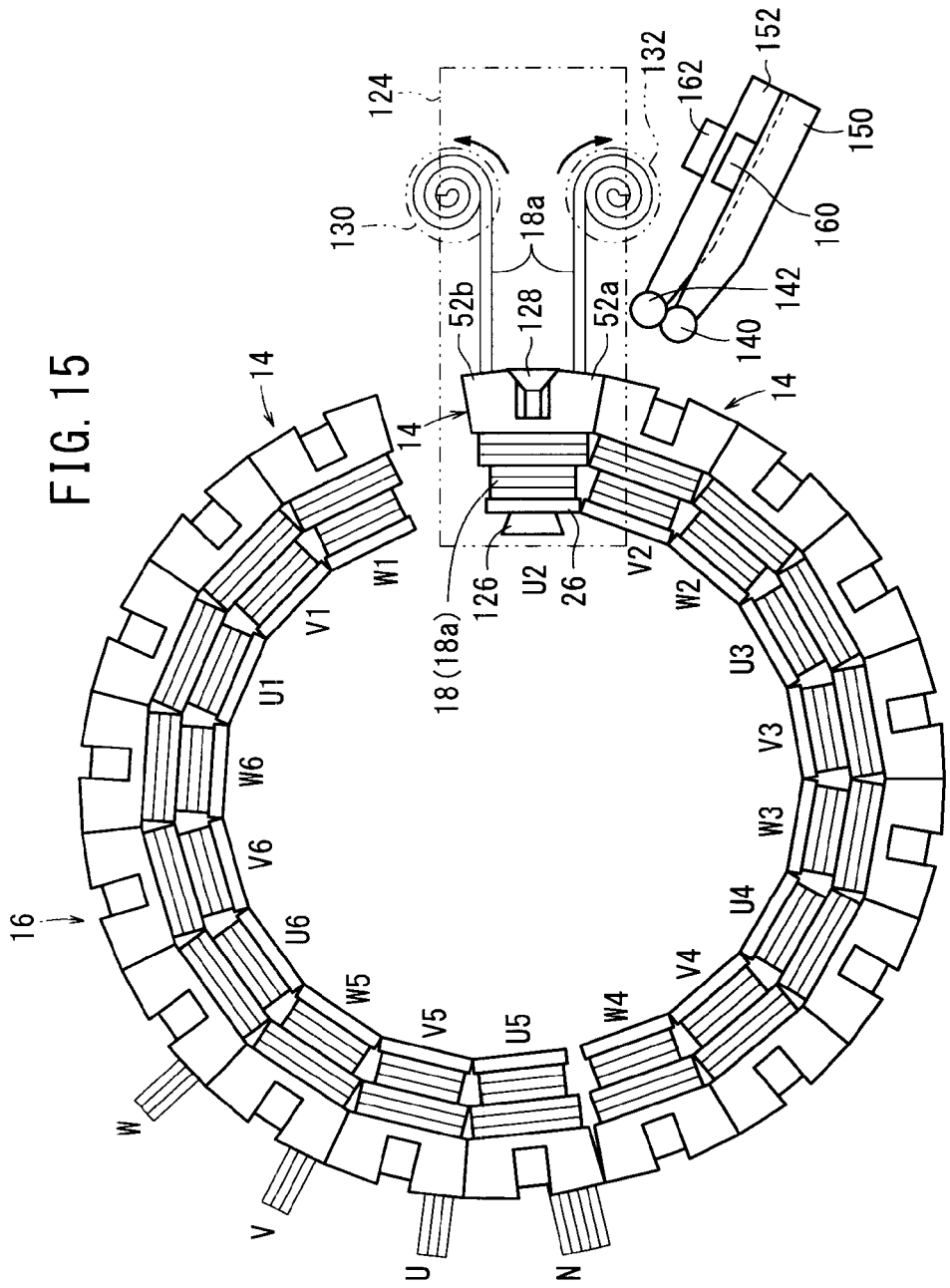
FIG. 15 is a plan view schematically showing the manner in which the last divided core member is placed on the table.

After a sufficient working space has been provided for placing the divided core member 14 in the U2-phase on the table 120, the pallet 124 is moved by the moving mechanism (not shown) from the position shown in FIG. 14 to the position shown in FIG. 15, and then, the divided core member 14 in the U2-phase is placed on the table 120 (step S9 of FIG. 6). Thereafter, the second group of nine divided core members 14 is angularly displaced by an angle −θ toward the central line 172, i.e., toward the first group of eight divided core members 14.

Figure 16:
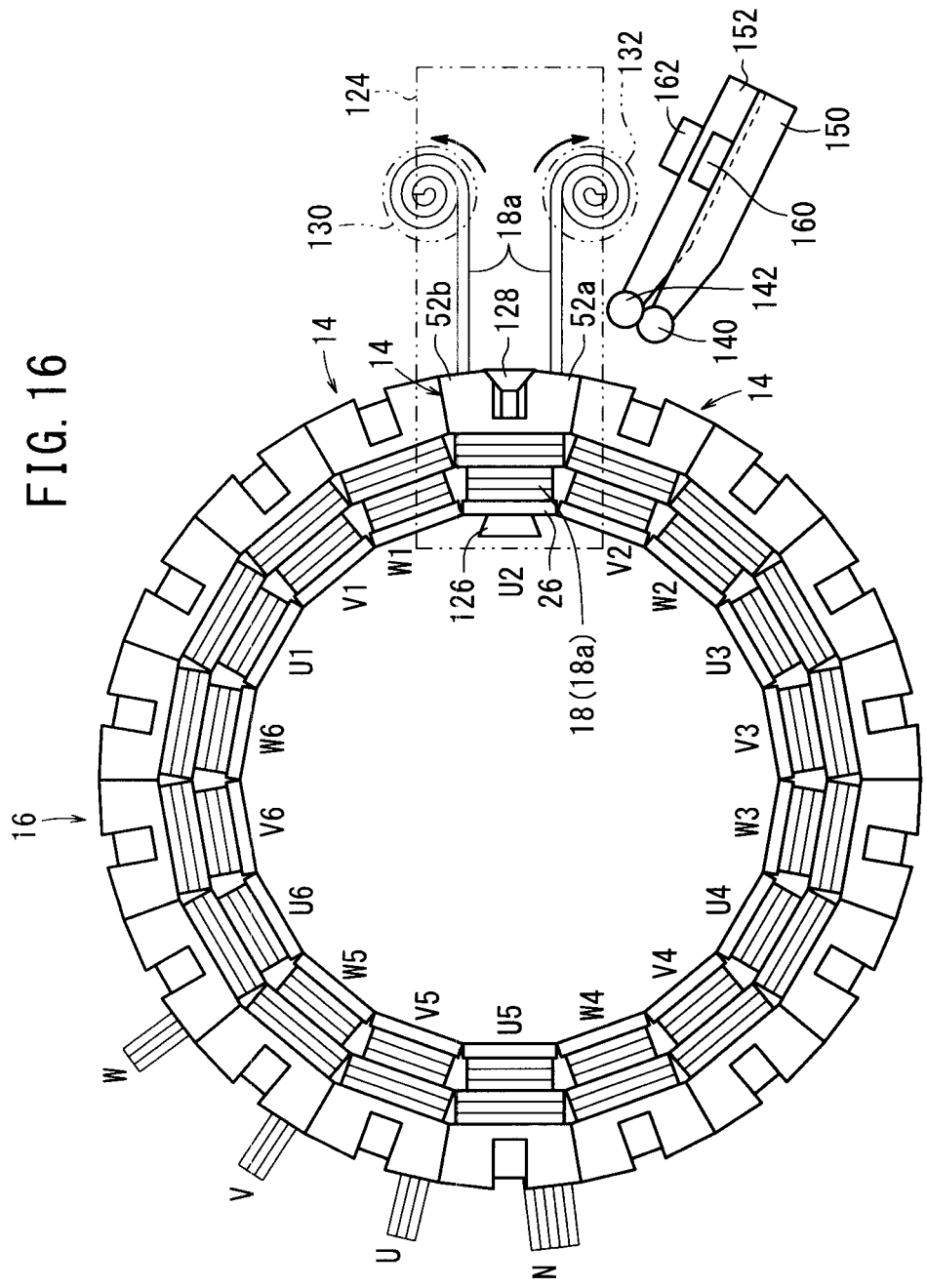
FIG. 16 is a plan view schematically showing the manner in which the two adjacent divided core members are brought toward the last divided core member.

The divided core member 14 in the W1-phase and the divided core member 14 in the V2-phase are brought toward the divided core member 14 in the U2-phase, as shown in FIG. 16. Therefore, the three divided core members 14 in the W1-, U2-, and V2-phases are changed from the state shown in FIG. 17A to the state shown in FIG. 17B. As a result, the three divided core members 14 are joined together along the circumferential direction of the stator core 16, whereupon all of the three divided core members 14 are neatly positioned in an annular pattern on the table 120 (step S10 of FIG. 6).

After step S10, steps S4 through S7 are carried out successively.

More specifically, in step S4, the clamps 126, 128 release the divided core member 14 in the U2-phase, and then the clamps 126, 128 are retracted from the divided core member 14 in the U2-phase.

The beginning end of the coil strand 18a of the divided core member 14 in the U2-phase is temporarily wound on the pulley 130, whereas the terminal end of the coil strand 18a is temporarily wound on the pulley 132. The beginning end of the coil strand 18a is pulled to the position of the input terminal W, and the terminal end of the coil strand 18a is pulled to the position of the neutral terminal N. More specifically, the beginning and terminal ends of the coil strand 18a are pulled in the following manner.

Figure 18A:
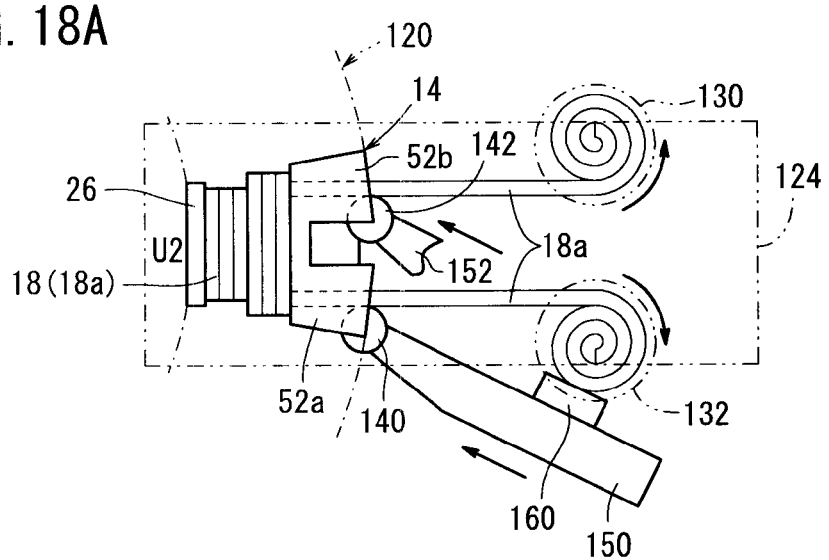
FIG. 18A is a plan view schematically showing the manner in which presser jigs are moved toward ends of coil strands.

First, as shown in FIG. 18A, the support arms 150, 152 are moved toward the divided core member 14 in the U2-phase, whereupon the presser jig 140 is inserted into the lead end holding groove 56a until the presser jig 140 contacts the terminal end of the coil strand 18a. The presser jig 142 also is inserted into the lead end holding groove 56b until the presser jig 142 contacts the terminal end of the coil strand 18a. The beginning end of the coil strand 18a, which is temporarily wound on the pulley 130, may be held in contact with the holder 162. The pulleys 130, 132 are rotated in directions to wind beginning and terminal ends of the coil strand 18a to such an extent that the beginning and terminal ends of the coil strand 18a are prevented from loosening.

Figure 18B:
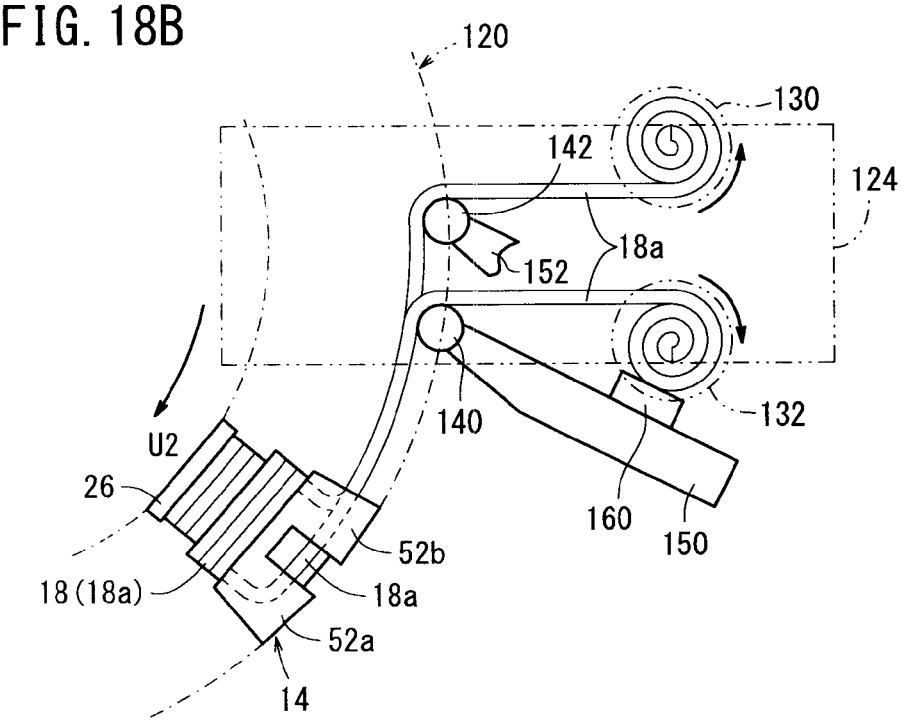
FIG. 18B is a plan view schematically showing the manner in which ends of the coil strands are inserted into respective lead end holding grooves while the table rotates.

The rotational shaft (not shown), which is coupled to the center of the table 120, is rotated in order to rotate the table 120 clockwise as shown in FIG. 18B. Thus, the divided core members 14 on the table 120 are rotated clockwise. Beginning and terminal ends of the coil strand 18a of the divided core member 14 in the U2-phase are unreeled respectively from the pulleys 130, 132 in opposition to the rotation of the pulleys 130, 132, to thereby wind the beginning and terminal ends of the coil strand 18a.

The presser jig 140 presses and inserts the terminal end of the coil strand 18a into the lead end holding grooves 56a, 56b of the divided core members 14 as the coil strand 18a is paid out from the pulley 132. The presser jig 140 pulls the terminal end of the coil strand 18a clockwise circumferentially along the stator core 16 as the table 120 and the divided core members 14 are rotated clockwise. The presser jig 142 also presses and inserts the beginning end of the coil strand 18a into the lead end holding grooves 58a, 58b of the divided core members 14 as the coil strand 18a is paid out from the pulley 130. The presser jig 142 pulls the beginning end of the coil strand 18a clockwise circumferentially along the stator core 16 as the table 120 and the divided core members 14 are rotated clockwise.

Inasmuch as the disk-shaped presser jigs 140, 142 contact beginning and terminal ends of the coil strand 18a, the disk-shaped presser jigs 140, 142 are capable of pressing the beginning and terminal ends of the coil strand 18a reliably into the lead end holding grooves 56a, 56b, 58a, 58b and down to the bottom surfaces 100a, 100b, 102a, 102b thereof, without applying an undue surface pressure to the beginning and terminal ends of the coil strand 18a. In addition, when the disk-shaped presser jigs 140, 142 press and pull the beginning and terminal ends of the coil strand 18a, the disk-shaped presser jigs 140, 142 avoid causing damage to the beginning and terminal ends of the coil strand 18a upon contact therewith.

Figure 19A:
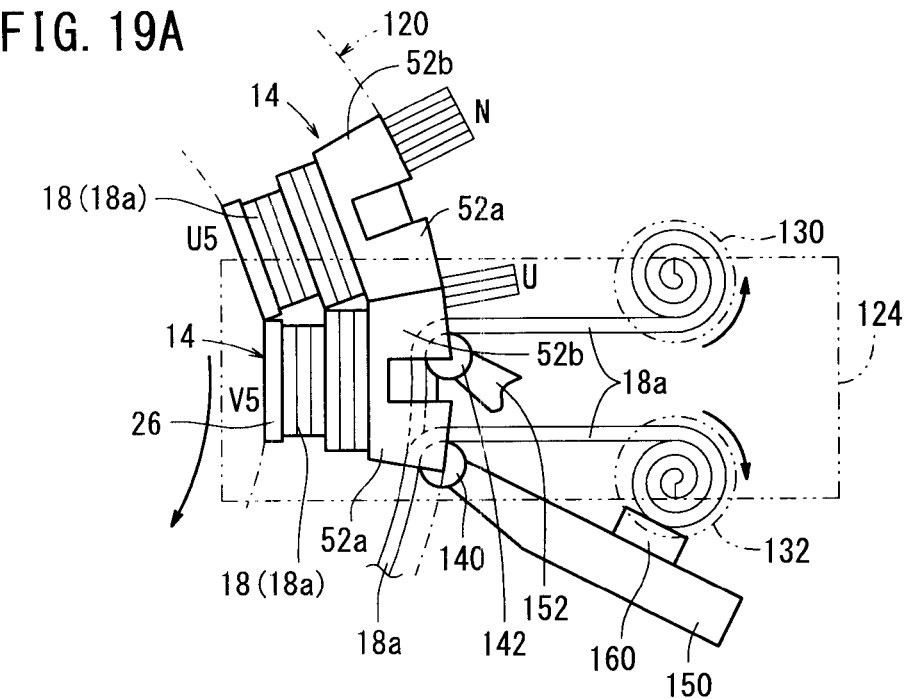
FIG. 19A is a plan view schematically showing one of the ends of the coil strands, which has reached a location where an input terminal is disposed.
Figure 19B:
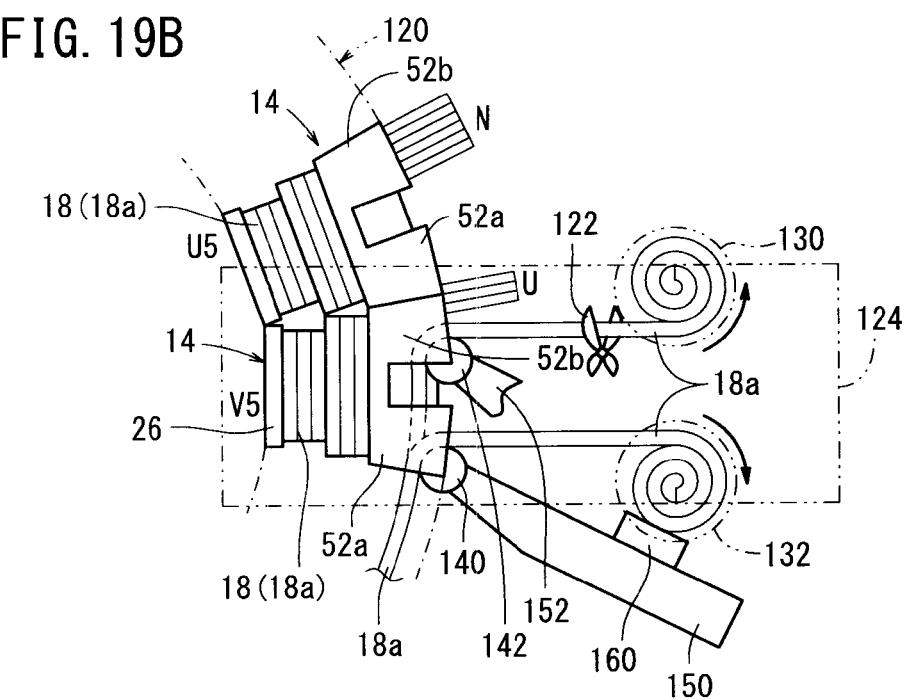
FIG. 19B is a plan view schematically showing the manner in which an end of the coil strand is severed.

Thereafter, when the divided core member 14 in the U2-phase has reached the position of the input terminal U, i.e., a position proximate the divided core member 14 in the V5-phase as shown in FIGS. 1 and 19A, rotation of the table 120 is temporarily stopped.

Then, in step S5, the cutter 122 severs the beginning end of the coil strand 18a, leaving a certain coil strand length that extends from the lead end holding groove 58b of the divided core member 14 in the U2-phase, i.e., a coil strand length which is large enough to be connected to the input terminal U. At this time, the portion of the beginning end of the coil strand 18a, which is inserted into the lead end holding groove 58b, is pressed in the lead end holding groove 58b by the presser jig 142. Further, the portion of the beginning end of the coil strand 18a, which is temporarily wound on the pulley 130, is held by the holder 162 (see FIGS. 7 and 8). Therefore, when the beginning end of the coil strand 18a is severed by the cutter 122, the portion of the beginning end of the coil strand 18a that is inserted into the lead end holding grooves 58a, 58b is prevented from becoming dislodged from the lead end holding grooves 58a, 58b. Also, the portion of the beginning end of the coil strand 18a that is temporarily wound on the pulley 130 is prevented from becoming dislodged from the pulley 130, and also is prevented from collapsing or becoming loosened on the pulley 130.

When the beginning end of the coil strand 18a of the divided core member 14 in the U2-phase has been pulled to the region where the input terminal U is located, the presser jig 142, the support arm 152, and the holder 162 are retracted from the table 120. Thus, the presser jig 142 and the holder 162 are spaced from the beginning end of the coil strand 18a.

At this time, the terminal end of the coil strand 18a of the divided core member 14 in the U2-phase has not yet been pulled to the region where the neutral terminal N is located (step S6: NO). The rotational shaft (not shown), which is coupled to the center of the table 120, is rotated to turn the table 120 clockwise in FIG. 20A. The presser jig 140 presses the terminal end of the coil strand 18a into the lead end holding grooves 56a, 56b of the divided core members 14 as the coil strand 18a is paid out from the pulley 132, and also pulls the terminal end of the coil strand 18a clockwise circumferentially along the stator core 16.

Figure 20A:
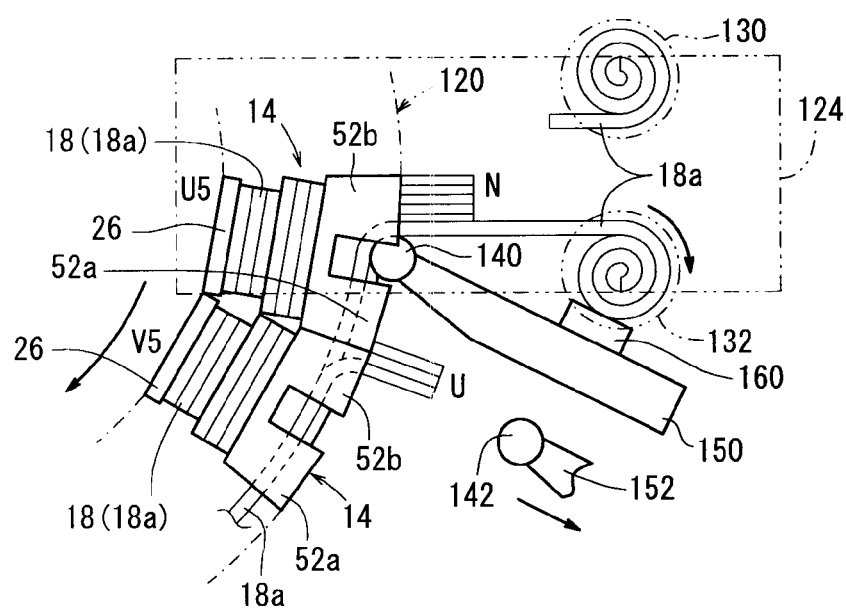
FIG. 20A is a plan view schematically showing the manner in which one of the presser jigs is retracted from the end of the coil strand.
Figure 20B:
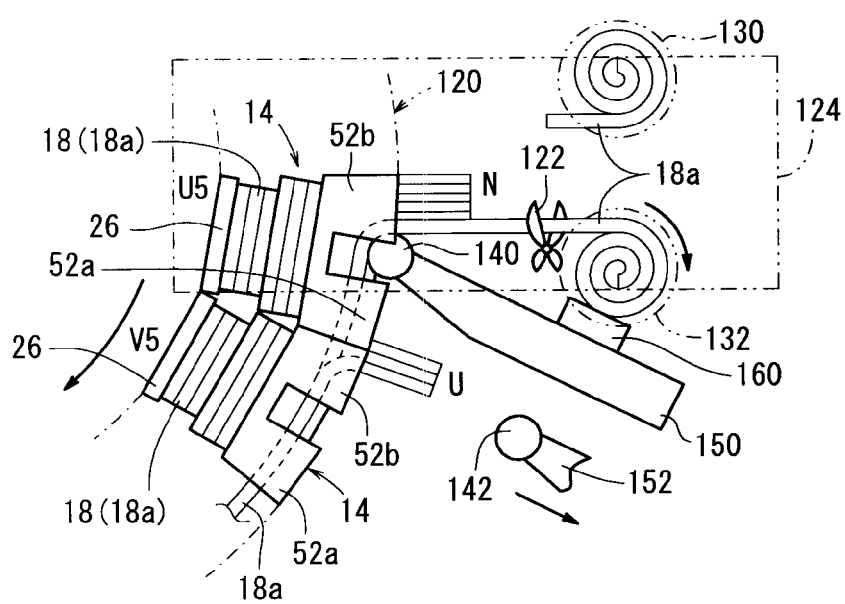
FIG. 20B is a plan view schematically showing another one of the ends of the coil strands, which has reached a location where a neutral terminal is disposed.

When the terminal end of the coil strand 18a of the divided core member 14 in the U2-phase has reached the region where the neutral terminal N is located, i.e., a position proximate the divided core member 14 in the U5-phase as shown in FIGS. 1 and 20B, the cutter 122 severs the terminal end of the coil strand 18a, thereby leaving a certain coil strand length, which extends from the lead end holding groove 56b of the divided core member 14 in the U2-phase, i.e., a coil strand length which is large enough to be connected to the neutral terminal N (step S5). At this time, the portion of the terminal end of the coil strand 18a, which is inserted into the lead end holding groove 56a, is pressed in the lead end holding groove 56a by the presser jig 140. Further, the portion of the terminal end of the coil strand 18a, which is temporarily wound on the pulley 132, is held by the holder 160. Therefore, when the terminal end of the coil strand 18a is severed by the cutter 122, the portion of the terminal end of the coil strand 18a that is inserted into the lead end holding grooves 56a, 56b is prevented from becoming dislodged from the lead end holding grooves 56a, 56b. Also, the portion of the terminal end of the coil strand 18a that is temporarily wound on the pulley 132 is prevented from becoming dislodged from the pulley 132, and is prevented from collapsing or becoming loosened on the pulley 132.

Figure 21A:
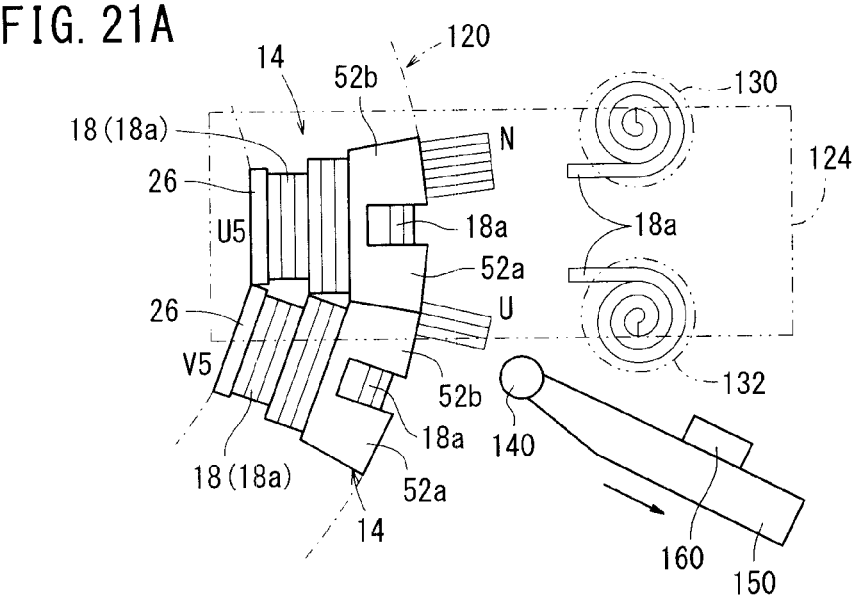
FIG. 21A is a plan view schematically showing the manner in which the other presser jig is retracted from the end of the coil strand.
Figure 21B:
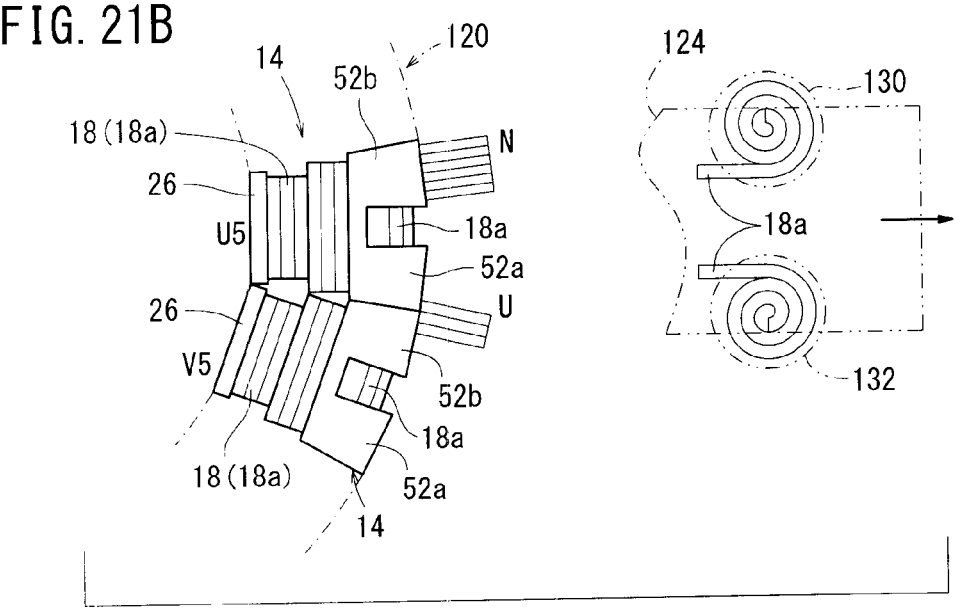
FIG. 21B is a plan view schematically showing the manner in which a pallet with pulleys mounted thereon is retracted from the divided core members.

When the terminal end of the coil strand 18a of the divided core member 14 in the U2-phase has been pulled to the region where the neutral terminal N is located, the presser jig 140, the support arm 150, and the holder 160 are retracted from the table 120, as shown in FIG. 21A. Thus, the presser jig 140 and the holder 160 are spaced from the terminal end of the coil strand 18a.

Finally, the pallet 124 is retracted from the table 120. The process of installing beginning and terminal ends of the coil strand 18a on the divided core member 14 in the U2-phase is now completed (step S6: YES).

Details of the manufacturing method according to the present embodiment, for pulling beginning and terminal ends of the coil strands 18a of the divided core members 14 in the W5- and U2-phases, have been described above with reference to FIGS. 7 through 21B. The process of pulling beginning and terminal ends of the coil strands 18a of the divided core members 14 in the U2-phase is applicable to the other divided core members 14, apart from the divided core members 14 in the W5- and U2-phases.

Unlike the divided core members 14 in the U2-phase, however, a sufficient working space is available for placing the other divided core members 14 on the table 120. Therefore, steps S2 through S7 may performed successively on the other divided core members 14, from the divided core members 14 disposed near the input terminals U, V, W and the neutral terminal N, so as to place the divided core members 14 in an annular pattern on the table 120, and to pull the beginning and terminal ends of the coil strands 18a in one direction circumferentially along the stator core 16 to the input terminals U, V, W and the neutral terminal N.

The manufacturing method according to the present embodiment does not pull the ends of the coil strands 18a circumferentially along the stator core 16 of the stator 10, after all of the divided core members 14 have been placed in an annular pattern on the table 120, as disclosed in Japanese Laid-Open Patent Publication No. 2000-217293, but rather, places the divided core members 14 one-by-one on the table 120, whereupon the ends of the coil strands 18a of each of the divided core members 14 are inserted into corresponding ones of the lead end holding grooves 56a, 58a, 60a, 62a, 56b, 58b, 60b, 62b, thereby pulling the ends of the coil strand 18a each time that a divided core member 14 is placed on the table 120. Consequently, the ends of the coil strands 18a of all of the divided core members 14 are prevented from extending radially outward from the stator core 16. The manufacturing method according to the present embodiment is thus capable of manufacturing a rotary electric machine in a space-saving environment, without causing damage to the divided core members 14.

Furthermore, according to the present embodiment, after all of the divided core members 14 have been fabricated in step S1, steps S2 through S7 are repeated in order to construct the stator 10. Steps S1 through S7 may also be repeated in order to construct the stator 10.

Since the ends of the coil strands 18a are temporarily wound on the pulleys 130, 132, the ends of the coil strands 18a are prevented from extending radially outward from the stator 10.

When all of the divided core members 14 have been placed in an annular pattern on the table 120 in step S5, severed ends of all of the coil strands 18a are disposed in a region where the input terminals U, V, W and the neutral terminal N are located. Therefore, the ends of all of the coil strands 18a can be bundled together and easily be connected to the input terminals U, V, W and the neutral terminal N.

According to the present embodiment, steps S2 through S7 are performed successively on the divided core members 14, which are disposed near the region where the input terminals U, V, W and the neutral terminal N are located, thereby placing a plurality of divided core members 14 in an annular pattern. Consequently, ends of the coil strands 18a can be pulled to the region where the input terminals U, V, W and the neutral terminal N are located, without being exposed or subjected to slackening.

When the last divided core member 14 is placed in a minimum working space on the table 120, steps S8 through S10 are performed in order to widen the minimum working space and to prevent the last divided core member 14 from coming into contact with the two adjacent divided core members 14. As a result, the last divided core member 14 can be placed on the table 120 without causing damage to the last divided core member 14 or to the two adjacent divided core members 14, and thus, the burden on the operator of the manufacturing apparatus 170 can be reduced. The last divided core member 14 can also be placed on the table 120 without causing the ends of the coil strand 18a to be subjected to slackening.

The present invention is not limited to the above embodiment, but changes and modifications may be made thereto without departing from the scope of the invention.

Figure 22:
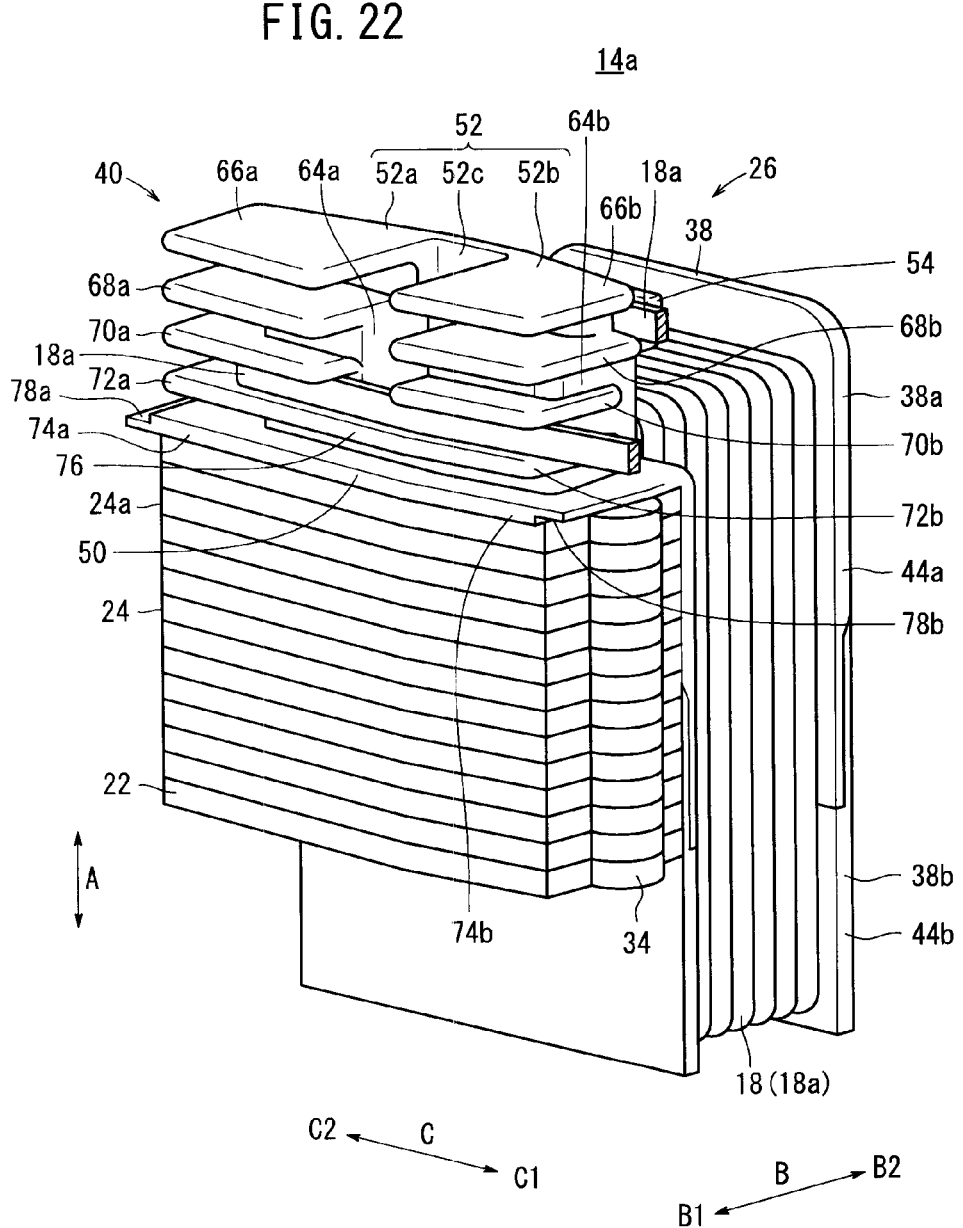
FIG. 22 is a perspective view of a divided core member according to a modification.

FIG. 22 shows in perspective a divided core member 14a according to a modification. A plurality of such divided core members 14a may be placed in an annular pattern on the table 120 to thereby produce a stator core 16.

The divided core member 14a shown in FIG. 22 differs from the divided core members 14 shown in FIGS. 1 through 21B, in that the divided core member 14a has a terminal end securing member 54 for securing the terminal end of the coil strand 18a, which has been wound on the coil frame 38. The terminal end securing member 54 is disposed on the back of the lead holder 52, i.e., on an end portion of the lead holder 52 in the direction of the arrow C1, and on the back thereof in the direction of the arrow B2.

When the coil strand 18a is wound on the insulator 26, the beginning end of the coil strand 18a extends along the direction of the arrow B1 from the end of the block 52a in the direction of the arrow C2. Also, the terminal end of the coil strand 18a is secured by the terminal end securing member 54 and extends along the direction of the arrow B1 from the end of the block 52b in the direction of the arrow C1. Therefore, the coil strand 18a is wound on the insulator 26 in directions that are opposite to the directions in which the coil strand 18a is wound on the insulator 26 of each of the divided core members 14 shown in FIGS. 1 through 5.

Assuming that a plurality of divided core members 14a are placed in an annular pattern in order to construct a stator core 16 according to the manufacturing method shown in FIGS. 6 through 21B, then the processes described above with reference to FIGS. 6 through 21B should be modified in the following ways.

(1) Since in FIG. 22 the coil strand 18a is wound on the insulator 26 in directions that are opposite to the directions in which the coil strand 18a is wound on the insulator 26 of each of the divided core members 14 shown in FIGS. 1 through 5, as described above, the terminal end of the coil strand 18a is temporarily wound around the pulley 130, and the beginning end of the coil strand 18a is temporarily wound around the pulley 132.

(2) Because of modification (1) above, the presser jig 140 is positioned to press the terminal end of the coil strand 18a into the lead end holding grooves 56a, 56b as the coil strand 18a is paid out from the pulley 130. Also, the holder 160 is positioned to hold the terminal end of the coil strand 18a, which is temporarily wound around the pulley 130.

(3) Further, as a result of modification (1) above, the other presser jigs 142, 144, 146 are positioned to press the beginning ends of the coil strands 18a into the lead end holding grooves 58a, 60a, 62a, 58b, 60b, 62b as the coil strands 18a are paid out from the corresponding pulleys 132. Also, the other holders 162, 164, 166 are positioned to hold the beginning ends of the coil strands 18a, which are temporarily wound around the respective pulleys 130.

With the processes being modified as described above, steps S1 through S10 of the flowchart shown in FIG. 6 are executed, so as to fabricate a stator core 16 made up from divided core members 14a arranged in an annular pattern.

Although certain preferred embodiments of the present invention have been shown and described in detail, it should be understood that various changes and modifications may be made to the embodiments without departing from the scope of

What is claimed is:

1. A method of manufacturing a rotary electric machine, which incorporates a stator including a stator core having an annular assembly of plural divided core members, comprising the steps of:
   (a) winding a coil strand on an insulator that surrounds a portion of a divided iron core, thereby producing a divided core member;
   (b) placing the divided core member on a table; and
   (c) while the table rotates about its axis, inserting ends of the coil strands into lead end holding grooves, the leading end holding grooves are defined in a surface of the insulator on an outer circumferential edge of the stator and extend along a circumferential direction of the stator.

2. The method according to claim 1, wherein at least step (b) and step (c) are repeated.

3. The method according to claim 1, wherein the ends of the coil strand are temporarily wound around respective pulleys.

4. The method according to claim 3, further comprising the step of:
   (d) after pulling the ends of the coil strand to a region at which terminals of the rotary electric machine are located, severing portions of the ends of the coil strand, which extend between the lead end holding grooves and the pulleys.

5. The method according to claim 4, wherein steps (b), (c) and (d) are repeatedly performed in an order from a divided core member nearest to the region at which the terminals of the rotary electric machine are located, thereby placing the plural divided core members in an annular pattern.

6. The method according to claim 5, further comprising the steps of:
   (e) when a last divided core member is placed in a second region remote from the region at which the terminals of the rotary electric machine are located, spacing two of the divided core members adjacent to the second region away from each other, and placing a last divided core member in the second region; and
   (f) bringing the two divided core members adjacent to the second region toward the last divided core member, which has been placed in the second region, thereby joining the last divided core member and the two divided core members to each other.

* * * * *